(12) United States Patent
White

(10) Patent No.: US 10,030,588 B2
(45) Date of Patent: Jul. 24, 2018

(54) GAS TURBINE COMBUSTOR DIAGNOSTIC SYSTEM AND METHOD

(71) Applicants: General Electric Company, Schenectady, NY (US); ExxonMobil Upstream Research Company, Houston, TX (US)

(72) Inventor: Eugene Delano White, Simpsonville, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 701 days.

(21) Appl. No.: 14/557,068

(22) Filed: Dec. 1, 2014

(65) Prior Publication Data

US 2015/0152791 A1 Jun. 4, 2015

Related U.S. Application Data

(60) Provisional application No. 61/911,905, filed on Dec. 4, 2013.

(51) Int. Cl.
*F02C 9/26* (2006.01)
*F02C 3/34* (2006.01)
(Continued)

(52) U.S. Cl.
CPC .......... *F02C 9/26* (2013.01); *F01D 17/08* (2013.01); *F02C 3/34* (2013.01); *F02C 7/228* (2013.01);
(Continued)

(58) Field of Classification Search
CPC ...... F02C 9/26; F02C 9/28; F02C 3/34; F02C 7/228; F01D 17/08; F23C 9/06;
(Continued)

(56) References Cited

U.S. PATENT DOCUMENTS 2,488,911 A  11/1949  Hepburn et al.
2,884,758 A  5/1959  Oberle
(Continued)

FOREIGN PATENT DOCUMENTS

CA  2231749  9/1998
CA  2645450  9/2007
(Continued)

OTHER PUBLICATIONS

PCT International Search Report & Written Opinion dated Aug. 31, 2015.
(Continued)

*Primary Examiner* — Phutthiwat Wongwian
*Assistant Examiner* — Loren Edwards
(74) *Attorney, Agent, or Firm* — Fletcher Yoder P.C.

(57) ABSTRACT

In an embodiment, a method includes performing a turbine combustor diagnostic routine including operating a first turbine combustor of a plurality of turbine combustors at a substantially steady state of combustion; adjusting an operational parameter of the first turbine combustor to cause a change in combustion products produced by the first turbine combustor; identifying a first sensor response of a first subset of a plurality of sensors disposed within or downstream from a turbine fluidly coupled to the turbine combustor, the first sensor response being indicative of the change in the combustion products, and wherein the first subset comprises one or more first sensors; correlating the first subset of sensors with the first turbine combustor; and diagnosing a condition of the first subset of the plurality of sensors, the first turbine combustor, or a combination thereof, based on the first sensor response.

23 Claims, 10 Drawing Sheets

(51) Int. Cl.
*F01D 17/08* (2006.01)
*F02C 7/228* (2006.01)
*F02C 9/28* (2006.01)
*G01M 15/14* (2006.01)
*G01M 15/10* (2006.01)
*F23N 5/00* (2006.01)
*F23C 9/06* (2006.01)
*G05B 15/02* (2006.01)

(52) U.S. Cl.
CPC .............. *F02C 9/28* (2013.01); *F23C 9/06* (2013.01); *F23N 5/003* (2013.01); *G01M 15/102* (2013.01); *G01M 15/14* (2013.01); F05D 2260/80 (2013.01); F05D 2270/083 (2013.01); F05D 2270/0831 (2013.01); F23C 2900/09002 (2013.01); F23N 2041/20 (2013.01); G05B 15/02 (2013.01); Y02E 20/16 (2013.01); Y02T 50/677 (2013.01)

(58) Field of Classification Search
CPC ........... F23C 2900/09002; F23N 5/003; F23N 5/006; F23N 2041/20; F23N 15/102; F23N 15/14; F05D 2260/80; F05D 2270/083; F05D 2270/0831; G05B 15/02; Y02E 20/16
USPC .......................................................... 60/773
See application file for complete search history.

(56) References Cited

U.S. PATENT DOCUMENTS

| | | | |
|---|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |

(56) References Cited

U.S. PATENT DOCUMENTS

| | | |
|---|---|---|
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,688,163 B2 | 2/2004 | Fujino et al. |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |

(56) References Cited

U.S. PATENT DOCUMENTS

| | | |
|---|---|---|
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |

(56) References Cited

U.S. PATENT DOCUMENTS

| | | |
|---|---|---|
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0032498 A1 | 10/2001 | Fujino et al. |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0148940 A1* | 8/2004 | Venkateswaran ..... F01D 17/085 60/772 |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0097895 A1 | 5/2005 | Kothnur et al. |
| 2005/0131656 A1* | 6/2005 | Ikeda ................. G05B 23/0264 702/188 |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0090471 A1* | 5/2006 | Shah ........................ F02C 9/28 60/772 |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248905 A1 | 11/2006 | Geskes |
| 2006/0288801 A1* | 12/2006 | Graze, Jr. ............ G01N 1/2252 73/863.02 |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |

(56) References Cited

U.S. PATENT DOCUMENTS

| | | |
|---|---|---|
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1* | 5/2013 | Mittricker ............ F02C 9/50 60/772 |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Angelyn et al. |
| 2014/0182302 A1 | 7/2014 | Angelyn et al. |
| 2014/0182303 A1 | 7/2014 | Angelyn et al. |
| 2014/0182304 A1 | 7/2014 | Angelyn et al. |
| 2014/0182305 A1 | 7/2014 | Angelyn et al. |
| 2014/0196464 A1 | 7/2014 | Biyani et al. |
| 2014/0216011 A1 | 8/2014 | Muthaiah et al. |
| 2015/0000292 A1 | 1/2015 | Subramaniyan |
| 2015/0000293 A1 | 1/2015 | Thatcher et al. |
| 2015/0000294 A1 | 1/2015 | Minto et al. |
| 2015/0000299 A1 | 1/2015 | Zuo et al. |
| 2015/0033748 A1 | 2/2015 | Vaezi |
| 2015/0033749 A1 | 2/2015 | Slobodyanskiy et al. |
| 2015/0033751 A1 | 2/2015 | Andrew |
| 2015/0033757 A1 | 2/2015 | White et al. |
| 2015/0040574 A1 | 2/2015 | Wichmann et al. |
| 2015/0059350 A1 | 3/2015 | Kolvick et al. |
| 2015/0075171 A1 | 3/2015 | Sokolov et al. |
| 2015/0152791 A1 | 6/2015 | White |
| 2015/0198089 A1 | 7/2015 | Muthaiah et al. |
| 2015/0204239 A1 | 7/2015 | Minto et al. |
| 2015/0214879 A1 | 7/2015 | Huntington et al. |
| 2015/0226133 A1 | 8/2015 | Minto et al. |

FOREIGN PATENT DOCUMENTS

| | | |
|---|---|---|
| CN | 1332422 A | 1/2002 |
| CN | 1519554 A | 8/2004 |
| CN | 1878936 A | 12/2006 |
| CN | 103069130 A | 4/2013 |

(56) References Cited

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | WO2014133406 | 9/2014 |

OTHER PUBLICATIONS

U.S. Appl. No. 14/771,450, filed Feb. 28, 2013, Valeev et al.
U.S. Appl. No. 14/067,552, filed Sep. 9, 2014, Huntington et al.
U.S. Appl. No. 14/553,458, filed Nov. 25, 2014, Huntington et al.
U.S. Appl. No. 14/599,750, filed Jan. 19, 2015, O'Dea et al.
U.S. Appl. No. 14/712,723, filed May 14, 2015, Manchikanti et al.
U.S. Appl. No. 14/726,001, filed May 29, 2015, Della-Fera et al.
U.S. Appl. No. 14/741,189, filed Jun. 16, 2015, Minto et al.
U.S. Appl. No. 14/745,095, filed Jun. 19, 2015, Minto et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods," SINTEF Group, www.energy.sintef.no/publixergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 (21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf, 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US), 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.

(56) References Cited

OTHER PUBLICATIONS

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
Chinese Office Action for CN Application No. 2014800748580 dated Jul. 3, 2017; 25 Pages.
Chinese Office Action for CN Application No. 2014800748580 dated Apr. 3, 2018; 36 pgs.

* cited by examiner

GAS TURBINE COMBUSTOR DIAGNOSTIC SYSTEM AND METHOD

CROSS-REFERENCE TO RELATED APPLICATIONS

This application claims priority to and benefit of U.S. Provisional Patent Application No. 61/911,905, entitled "GAS TURBINE COMBUSTOR DIAGNOSTIC SYSTEM AND METHOD," which is herein incorporated by reference in its entirety for all purposes.

BACKGROUND

The subject matter disclosed herein relates to gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. The turbine stages, when driven by the hot combustion products, transfer rotational power to a shaft. The rotating shaft, in turn, drives one or more compressor stages of a compressor section, and can also drive an electrical generator to produce electrical energy.

Combustor sections of gas turbine engines generally include more than one combustor, where each combustor combusts a fuel/oxidant mixture. However, variations in the combustion process, such as due to variations in fuel composition, oxidant composition, the nature of other materials present within the combustor, the end use of the gases produced in the combustor, or any combination thereof, may cause one or more operational parameters of one or more of the combustors to change. Therefore, combustor operations may be subject to further improvement.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment, a system includes a gas turbine system, having: a turbine combustion system having a plurality of turbine combustors each configured to combust a fuel/oxidant mixture to produce combustion products; a turbine driven by the combustion products produced by the turbine combustion system; a plurality of sensors positioned downstream of the turbine combustion system and configured to monitor one or more parameters of the combustion products; and a control system having one or more non-transitory machine-readable media collectively storing one or more sets of instructions executable by a processor to perform a turbine combustion system diagnostic routine. The diagnostic routine includes: adjusting an operational parameter of a first turbine combustor of the plurality of turbine combustors to cause a change in the combustion products produced by the first turbine combustor; identifying respective sensor responses of one or more first sensors of the plurality of sensors that detects the change in the combustion products; correlating the respective sensor responses with the first turbine combustor; and diagnosing a condition of the one or more first sensors, the first turbine combustor, or a combination thereof, based on the respective sensor responses.

In another embodiment, a method includes performing a turbine combustor diagnostic routine. The diagnostic routine includes the acts of: operating a first turbine combustor of a plurality of turbine combustors at a substantially steady state of combustion; adjusting an operational parameter of the first turbine combustor to cause a change in combustion products produced by the first turbine combustor; identifying a first sensor response of a first subset of a plurality of sensors disposed within or downstream from a turbine fluidly coupled to the turbine combustor, the first sensor response being indicative of the change in the combustion products, and wherein the first subset comprises one or more first sensors; correlating the first subset of sensors with the first turbine combustor; and diagnosing a condition of the first subset of the plurality of sensors, the first turbine combustor, or a combination thereof, based on the first sensor response.

In another embodiment, a system includes one or more non-transitory, machine-readable media collectively storing one or more sets of instructions executable by a processor to perform a turbine combustion system diagnostic routine. The diagnostic routine includes: operating a first turbine combustor of a plurality of turbine combustors at a combustion equivalence ratio of between approximately 0.95 and 1.05; adjusting a flow of fuel, a flow of oxidant, or a combination thereof, to the first turbine combustor to cause combustion products produced by the first turbine combustor to change from first combustion products to second combustion products that are different than the first combustion products; identifying a first sensor response of a first sensor that detects the second combustion products; correlating the first sensor with the first turbine combustor; and diagnosing a condition of the first sensor, the first turbine combustor, or a combination thereof, based on the first sensor response.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
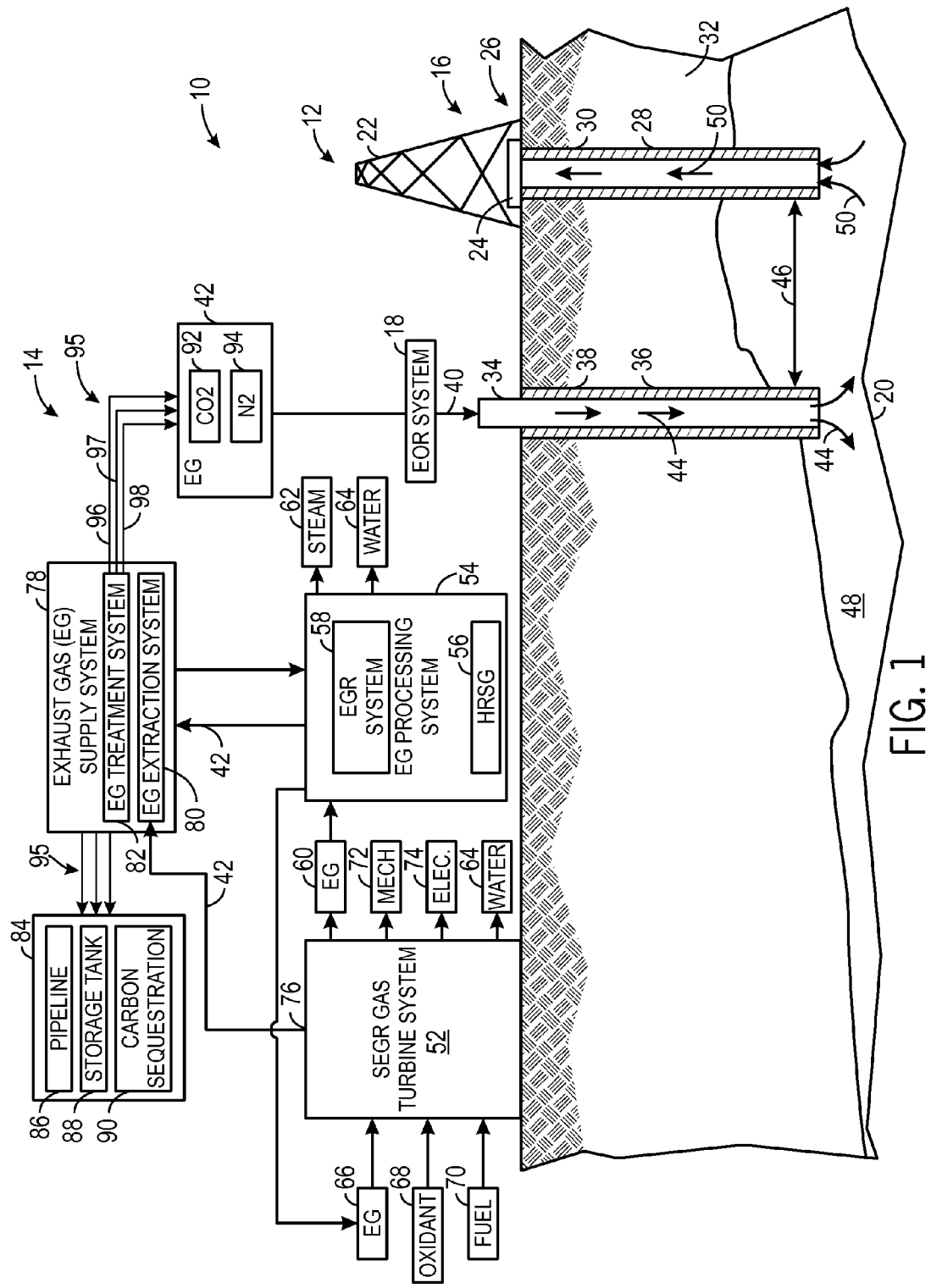
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "aft," and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

The disclosed embodiments also relate to diagnostic routines that can be performed on turbine systems having a plurality of combustors that discharge combustion products into a turbine section. The diagnostic routines may utilize information obtained by perturbing the operation of one of a plurality of combustors from a steady state, and monitoring a response from one or more sensors positioned downstream of the combustors. Indeed, the present embodiments may be implemented in any number of systems incorporating a gas turbine engine, and in particular gas turbine engines operating at well-defined fuel to oxidant combustion ratios. Example embodiments of systems in which the present techniques may be performed are discussed below with respect to FIGS. 1-4, with particular implementations being depicted in FIGS. 5 and 6. Aspects of the present embodiments, such as example methods for performing diagnostic routines, are discussed below with respect to FIGS. 7-9.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi (Φ), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
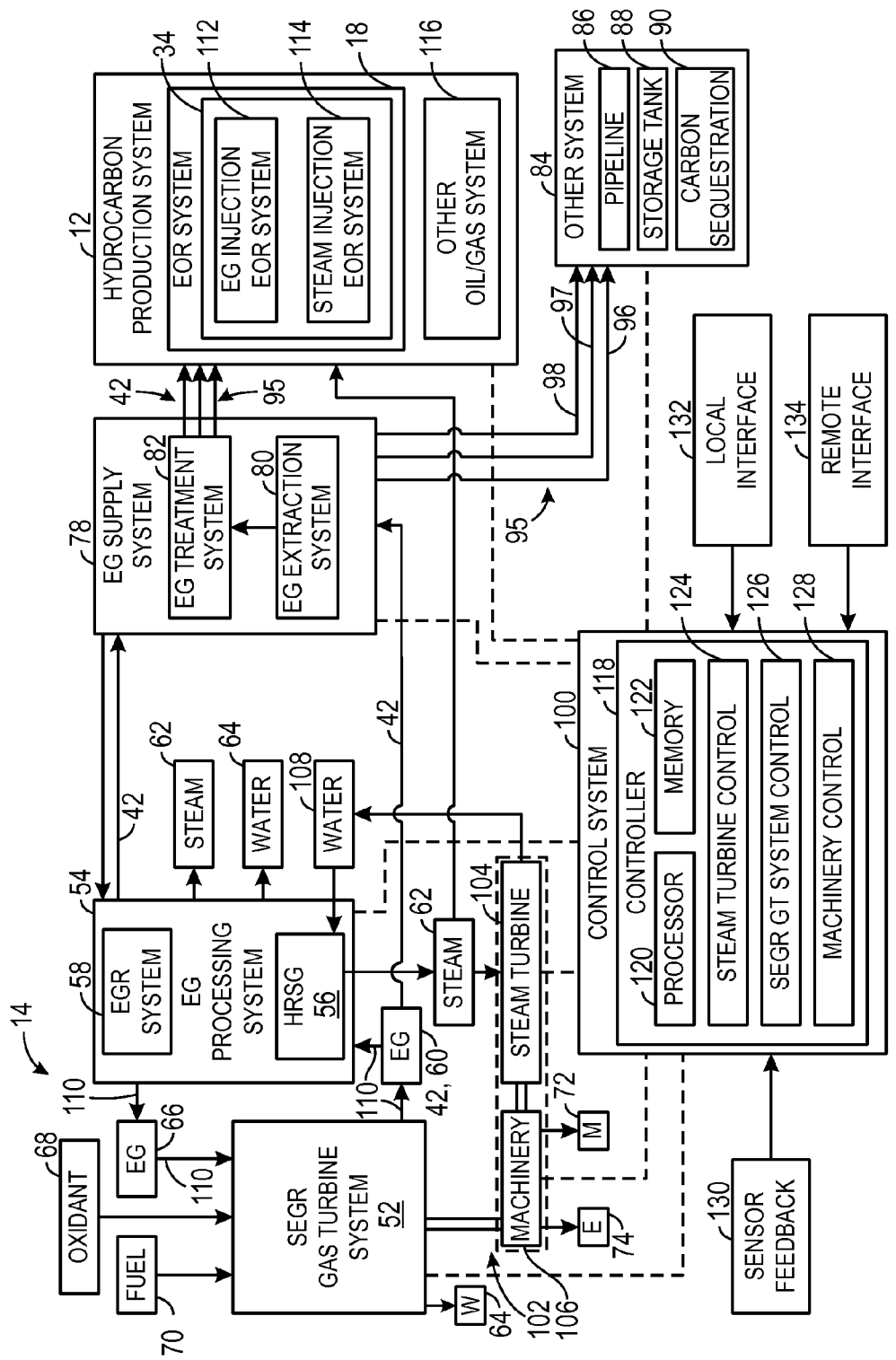
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
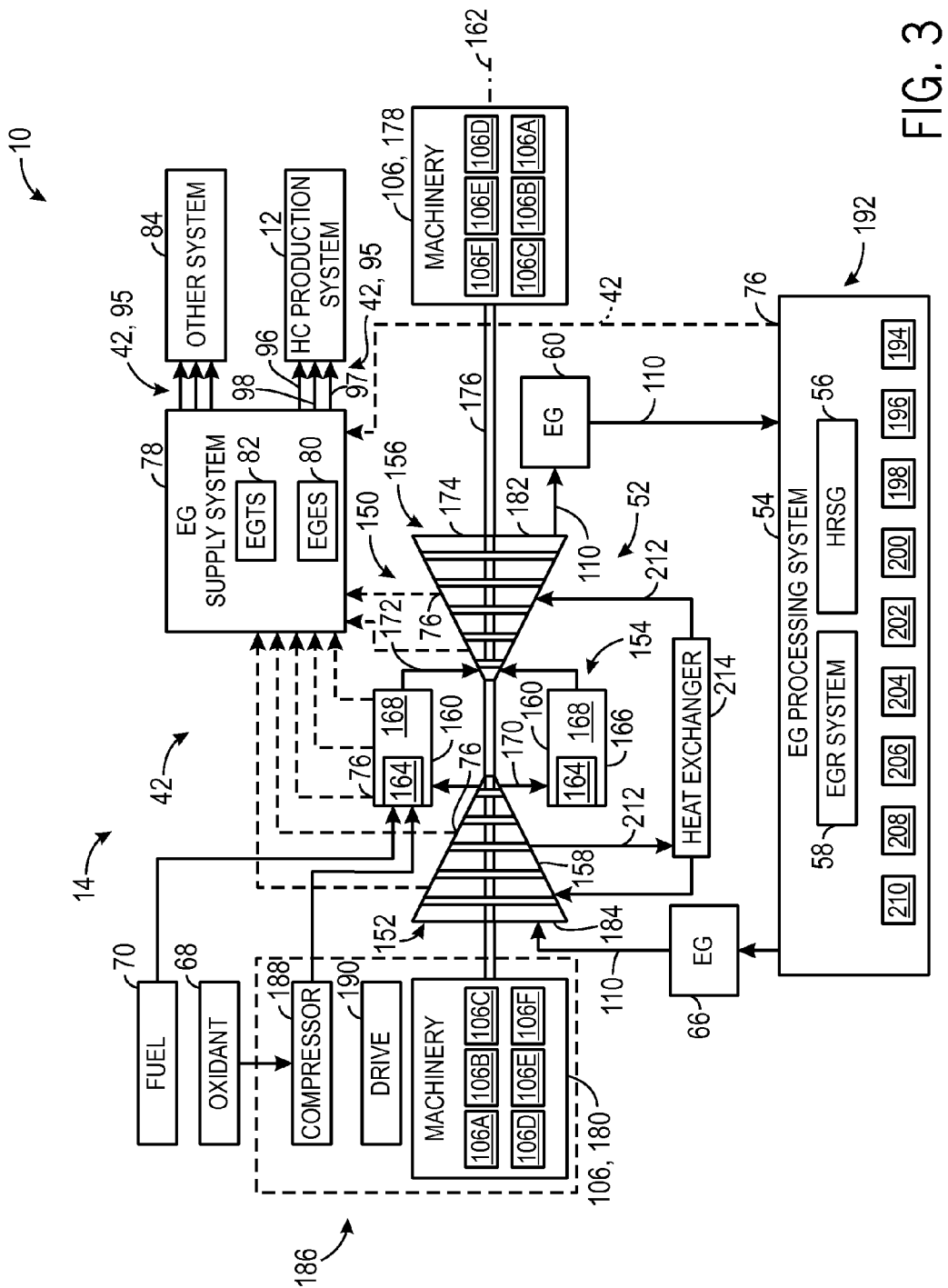
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX CLR | LP MOC | GEN | | |
| HP MOC | GBX CLR | LP MOC | GBX | GEN | |
| HP MOC | GBX HTR STGN | LP MOC | GEN | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

more, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Further-conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
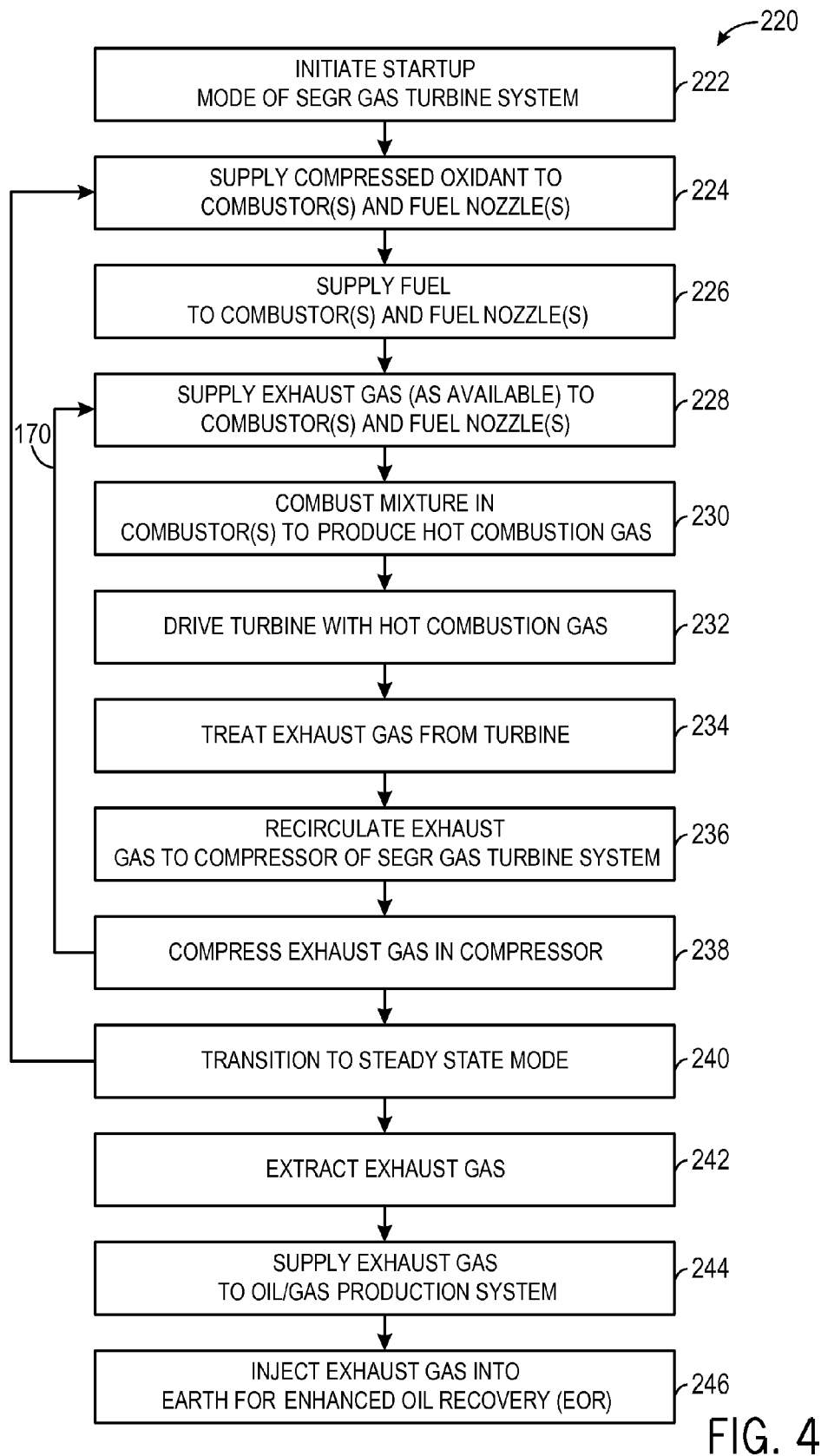
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, during certain combustion processes (e.g., stoichiometric combustion and/or combustion at a predetermined equivalence ratio) performed by the combustor 160, variations in the composition, flow rate, and/or ratio of the fuel 70 and oxidant 68 may occur and cause the composition of combustion products 172 produced by the combustor 160 to vary. Additionally or alternatively, one or more components of the combustor 160 (e.g., seals, valves) may become worn, may break, may crack, or may otherwise fail such that the combustion products produced by the combustor 160 may have a composition that does not fall within a predetermined range. For instance, if a seal of the combustor 160 should become worn or otherwise lose its ability to seal, air from the external environment may leak into the combustor 160, causing the combustion equivalence ratio to deviate from the desired set point (e.g., due to the presence of additional oxygen). In such a circumstance, the combustion products may have an oxygen concentration that is above a predetermined threshold.

Similar situations can also occur for other combustion parameters, such as a pressure set point, combustion temperature set point, an exhaust gas concentration set point, and other parameters that at least partially depend on proper combustion sealing and operation. Unfortunately, because the combustion products from a plurality of the combustors 160 are all combined within the turbine section 156, it can be difficult to determine which combustors 160 are responsible for off-specification combustion products. These types of deviations are of special concern in implementations where it is desired to keep the combustion products within a certain range—such as when the combustion gas/exhaust gas is exported from the SEGR gas turbine system 52 as a product gas for use in oil recovery, recirculation back into the SEGR gas turbine system 52 for cooling, for use as a combustion diluent, or any other implementation in which it may be undesirable to have uncombusted fuel and/or residual oxidant in the exhaust gas 60.

In accordance with present embodiments, as set forth above, the control system 100, in performing the process 220, may execute one or more control routines to enable combustion at desired fuel/oxidant equivalence ratios in each combustor 160. In certain control routines, the control system 100 may receive information relating to flow rates and/or compositions of the oxidant 68 and/or the fuel 70, and the control system 100 may utilize any number of control algorithms based on all or a portion of this information to adjust a flow of the fuel 70 and/or the oxidant 68 to the combustor 160.

Figure 5:
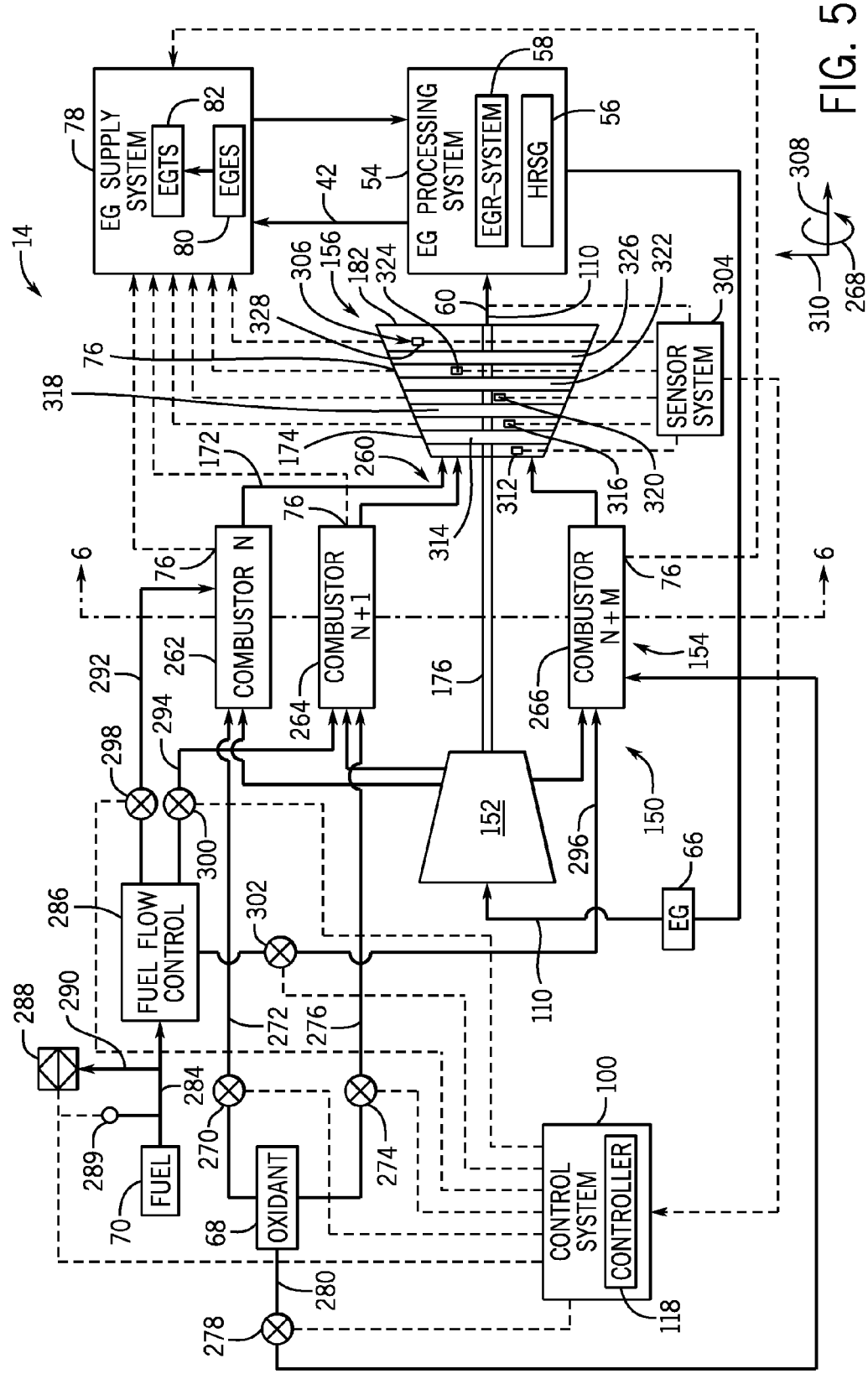
FIG. 5 is a diagram of an embodiment of the system of FIGS. 1-3, further illustrating details of a control system configured to adjust combustion parameters of one or more turbine combustors.

In accordance with present embodiments and as discussed in detail below, in embodiments where the control system 100 detects that one or more of the combustors 160 is operating out of specification (e.g., because the product exhaust gas is off-specification), or periodically during operation, the control system 100 may also perform one or more diagnostic routines (e.g., routines stored on one or more tangible, non-transitory, machine-readable media such as the memory 122) to identify which, if any, of the combustors 160 is operating in such a manner. FIG. 5 depicts an embodiment of the turbine-based service system 14 having features that enable the detection, localization, and control of potential combustor issues.

As set forth above with respect to FIGS. 1-3, the turbine-based service system 14 includes the gas turbine system 150, which produces exhaust gas 60 that is subsequently treated in the EG processing system 54 and delivered as a product gas to the EG supply system 78. The gas turbine system 150 also produces the exhaust gas 42, which is withdrawn from one or more extraction points 76 (e.g., the combustors 160, the turbine section 156) and is provided as a product gas to the EG supply system 78.

In general, the combustion gases 172, which correspond to the exhaust gas before such treatment, pass from the combustors 160 and into the turbine section 156 via a series of flow paths 260. The flow paths 260 may be entirely separate upon introduction to the turbine section 156, or one or more of the flow paths 260 may combine prior to entry into the turbine section 156. While the combustor section 154 may include any number of combustors 160, in the illustrated embodiment, the combustor section 154 includes a first combustor 262, designated as "COMBUSTOR N," a second combustor 264, designated as "COMBUSTOR N+1," and a third combustor 266, designated as "COMBUSTOR N+M," where "N" is intended to designate any particular combustor 160 of the combustor section 154, "N+1" is intended to denote the combustor 160 that is immediately adjacent to the first combustor 262, and "N+M" is intended to denote the $M^{th}$ combustor after the first combustor 262. For example, in an embodiment where the combustors 160 are positioned in a generally annular arrangement, the first combustor 262 may correspond to a first position in a circumferential direction 268, the second combustor 266 may correspond to a second position immediately adjacent to the first position, and the third combustor 266 may correspond to a third position, a fourth position, a fifth position, a sixth position, a seventh position, or an eighth position (or any position other than the first and second positions), along the circumferential direction 268.

During operation, the control system 100 may control the flow of oxidant 68 and the fuel 70 to each of the combustors 160 to enable combustion at a particular equivalence ratio. For instance, in embodiments where the turbine-based service system 14 is operating in a stoichiometric mode of operation, the equivalence ratio may be between approximately 0.95 to 1.05 fuel to oxidant, such as approximately 1.0 plus or minus 0.01, 0.02, 0.03, 0.04, or 0.05. The flow of the oxidant 68 may be controlled, at least in part, by controlling operating parameters of the oxidant compression system 186 (FIG. 3), such as a speed of the drive 190 (FIG. 3), a compression ratio of the main oxidant compressor(s) 188 (FIG. 3), inlet guide vane position of the compressor(s) 188, among others. In the illustrated embodiment, the oxidant flow is controlled using a series of oxidant flow control devices in addition to, or as an alternative to, the parameters of the oxidant compression system 186. In the illustrated embodiment, such devices include a first oxidant flow control device 270 (e.g., a flow control valve) positioned along a first oxidant flow path 272 leading to the first combustor 262, a second oxidant flow control device 274 (e.g., a flow control valve) positioned along a second oxidant flow path 276 leading to the second combustor 264, and a third oxidant flow control device 278 (e.g., a flow control valve) positioned along a third oxidant flow path 280 leading to the third combustor 266. Other features for monitoring and/or controlling the oxidant flows may also be utilized along these paths, including compressors, pumps, heat exchangers, flow meters, temperature meters, pressure meters, and oxygen sensors, among others.

While the flows of either or both of the oxidant 68 and the fuel 70 may be controlled so as to maintain a desired combustion equivalence ratio, in certain embodiments, the flows of the fuel 70 may respond to changes in the flows of the oxidant 68 to maintain the desired combustion equivalence ratio, or vice-versa (e.g., the reverse control is also possible, where the oxidant 68 is adjusted in response to the fuel 70). For instance, in one embodiment, the oxidant flow may be adjusted based off of load demand while the fuel flow responds to changes in the oxidant flow. In controlling the flow of the fuel 70, the control system 100 may receive various information about the fuel 70, including feedback generated by one or more sensors 282 positioned along a fuel path 284 leading to a fuel flow control system 286. The one or more sensors 282 may include one or more of any suitable type of flow analysis devices, including but not limited to thermal mass flow meters, Coriolis mass flow meters, mass flow controllers, rotary piston meters, gear meters, Venturi meters, orifice plate meters, dall tube meters, Pilot tube meters, multi-hole pressure probe meters, cone meters, optical flow meters, electromagnetic flow meters, ultrasonic flow meters, thermocouples, and pressure transducers, among others.

In addition to, or in lieu of, receiving feedback related to the flow of the fuel 70 along the fuel path 284, the control system 100 may also receive feedback related to the composition of the fuel 70 from a fuel analysis system 288. The fuel analysis system 288 may determine composition information related to the fuel 70. For example, the fuel analysis system 288 may determine a concentration of, or relative amounts of, combustible components within the fuel 70, which may include but are not limited to CO, $H_2$, methane ($CH_4$), or any combination thereof. Accordingly, the fuel analysis system 288 may include one or more analysis features capable of separating, detecting, and/or analyzing such components. For example, the fuel analysis system 288 may include any one or a combination of a gas chromatograph, a high performance liquid chromatograph, an infrared spectrometer, an ultraviolet/visible spectrometer, a fluorometer, a mass spectrometer, a nuclear magnetic resonance (NMR) spectrometer, an electron spin resonance (ESR) spectrometer, an atomic absorption unit, or the like. In some embodiments, the fuel analysis system 288 may include a CO sensor, an $H_2$ sensor, a $CH_4$ sensor, or similar sensors.

While the fuel analysis system 288 may be suitably positioned at any point along the fuel path 284, in the illustrated embodiment, the fuel analysis system 288 is configured to receive a slip stream 290 of the fuel 70 from the fuel path 284. That is, in the illustrated embodiment, the slip stream 290 is provided along a path diverging from the fuel path 284 to the fuel analysis system 288. During operation, the fuel analysis system 288 analyzes the fuel 70, such as for CO, $H_2$, and $CH_4$ concentrations, and sends the fuel composition information, intermittently, at regular intervals, or substantially continuously, to the control system 100/controller 118. In other embodiments, the fuel analysis system 288 may provide, intermittently, at regular intervals, or substantially continuously, raw data (e.g., detector signals) to the control system 100/controller 118, which may include code stored on one or more tangible, machine-readable, non-transitory media for analyzing the data.

Based at least in part on feedback received from the one or more sensors 282 and/or the fuel analysis system 288, the control system 100 may direct the fuel 70 from the fuel flow control system 286 along a first fuel supply path 292 to the first combustor 262, along a second fuel supply path 294 to the second combustor 264, and along a third fuel supply path 296 to the third combustor 266. It should be noted that any number of such flow paths and combustors 160 is presently contemplated, such as between 2 and 100, 10 and 50, 15 and 30, and so on. The fuel flow control 286 may include any number of features that enable the control system 100 to independently control the flow of the fuel 70 along each of the fuel supply paths. That is, the fuel flow control system 286 may enable the control system 100 to individually control the flow of fuel 70 to each of the combustors 160. As discussed in detail below, such independent control not only enables the fuel 70 to be supplied to each combustor 160 to ensure combustion at a predetermined equivalence ratio, but also enables the diagnostic routines described herein to be performed.

By way of non-limiting example, the fuel flow control system 286 may include any one or a combination of one or more flow distribution headers, booster compressors, booster blowers, heat exchangers (e.g., direct and/or indirect), filters, scrubbers, catalysts, desiccators, and flow control devices, among others. Additionally or alternatively, the control system 100 may communicate with one or more flow control devices positioned along the various fuel supply paths to enable adjustment of the flow of fuel 70 to each combustor 160. As illustrated, the flow control devices include, but are not limited to, a first fuel flow control device 298 positioned along the first fuel supply path 292, a second fuel flow control device 300 positioned along the second fuel supply path 294, and a third fuel flow control device 302 positioned along the third fuel supply path 296. Generally, the flow control devices may include any flow-adjusting devices capable of adjusting the flow of the fuel 70 into each respective combustor 160 including no flow, full flow, and any flow rate in between. Such flow control devices may include flow control valves, booster blowers, regulators, and compressors, among others. Further, the flow control devices may be positioned along any point of their respective fuel supply path. For instance, the flow control devices may be positioned along a conduit leading to the respective inlets of the combustors 160, or may be positioned at the respective inlets of the combustors 160. In some embodiments, the fuel flow control devices may be fuel trim valves. Therefore, the control system 100 may, in some embodiments, adjust one or more fuel level trim valves such that combustion within one or more of the combustors 160 is lean or rich. In accordance with present embodiments and as discussed in further detail below, one or more sensors may produce a response indicative of lean or rich combustion to enable correlation of the response back to the particular combustor 160 for which the fuel level was adjusted.

As noted above, independently controlling the fuel flow and/or oxidant flow to each combustor 160 enables certain diagnostics to be performed on the combustors 160. In accordance with present embodiments, the control system 100 may individually adjust the fuel and/or oxidant flows to adjust combustion parameters within each combustor 160, which results in a change in one or more parameters of the combustion products 172. The control system 100 may monitor the change in the one or more parameters of the combustion products 172 at one or more of the turbine stages 174 of the turbine section 156, and may correlate the change to the particular combustor 160 for which the combustion parameters were changed. For example, the combustor section 154 may be brought into a steady state, and the fuel flow and/or oxidant flow to the first combustor 262 may be adjusted to change the nature of the combustion products 172 produced by the first combustor 262, while the flows to the second and third combustors 264, 266 are maintained at the steady state. Therefore, even though the combustion products 172 produced by all of the combustors 160 combine upstream of any detection equipment, any changes detected by the detection equipment may be correlated back to the first combustor 262 (i.e., the combustor 160 for which the combustion parameters were changed).

Specifically, a sensor system 304 having one or more sensors 306 capable of detecting one or more parameters of the combustion products 172 within the turbine section 156 may be utilized for such detection. The sensors 306 may be positioned downstream from the turbine combustors 160, such as on or within the turbine section 156, and each sensor 306 may be capable of detecting parameters of the combustion products 172 including, but not limited to, compositional information, an oxygen concentration, a fuel concentration, a diluent concentration, a temperature, a pressure, a mass flow rate, or any combination of these or other parameters, of the combustion products 172. The one or more sensors 306 may, therefore, include CO sensors, $CH_4$ sensors, $O_2$ sensors (e.g., lambda sensors, narrow band heated exhaust gas oxygen (HEGO) sensors, wideband universal exhaust gas oxygen (UEGO) sensors), pressure sensors, temperature sensors (e.g., thermocouples), flow meters, or any combination thereof, among others. Indeed, the sensors 306 may be of any suitable type and construction that enables the sensing of combustion products, properties of the combustion products, or a combination thereof. As discussed in further detail below with respect to FIG. 10, it may be desirable for the sensors 306 to be UEGO sensors.

The sensors 306 may be in-situ devices that are positioned within the casing of the turbine section 156 (i.e., the sensors contact the working fluid), or may be ex-situ devices that include one or more conduits fluidly coupling the particular sensor 306 with the zone of the turbine section 156 in which the working fluid is contained. In other words, the in-situ sensors may be positioned within the casing of the turbine section 156, while the ex-situ sensors may be external to the casing.

As illustrated, the sensors 306 may be positioned at various points along an axial direction 308 and at any point in a radial direction 310 in the turbine section 156. Indeed, the sensors 306 may be positioned proximate the turbine stages 174 (e.g., between the turbine stages 174) or at the turbine stages 174 (e.g., attached to the turbine casing, positioned between the casing and the rotating turbine blades, integrated into the turbine wheels). To facilitate discussion of the present embodiments, the sensors 306 are depicted as being positioned between the turbine stages 174. Moving from a fore end to an aft end of the turbine section 156, the sensors 306 include a first sensor 312 (or group of sensors present as a first section) positioned before a first turbine stage 314, a second sensor 316 (or group of sensors present as a second section) before a second turbine stage 318, a third sensor 320 (or group of sensors present as a third section) before a third turbine stage 322, a fourth sensor 324 (or group of sensors present as a fourth section) before a fourth turbine stage 326, and a fifth sensor 328 (or group of sensors present as a fifth section) after the fourth turbine stage 326.

As discussed in detail below, the response of each sensor 306 and/or sensor array (e.g., the feedback produced by each sensor and/or sensor array) may be correlated to the operation of one or more of the combustors 160 depending on a number of factors. These factors may include, but are not limited to, the particular load point at which the gas turbine system 150 is running (e.g., 80% load, 90% load, 100% load), the position of the sensor 306 or sensor array relative to the combustor 160 (e.g., the location in the circumferential, axial, and/or radial directions 268, 308, 310), the size of the sensor 306 or sensor array (e.g., the cross-sectional area that the sensor 306 or sensor array covers), the particular arrangement of the turbine blades (e.g., the swirl of combustion gases created by the turbine blades at a particular load), or any combination thereof.

The control system 100 and/or controller 118 may utilize feedback (e.g., compositional information) obtained from any one or a combination of the sensors 306, and may adjust, when appropriate, the flow of the fuel 70 through the fuel supply paths 292, 294, 296 and/or the flow of the oxidant 68 along the oxidant supply paths 272, 276, 280 to adjust the ratio of fuel 70 to oxidant 68 in each of the combustors 160, for example to achieve combustion at a desired equivalence ratio (e.g., between approximately 0.95 and 1.05). Additionally or alternatively, the controller 118 may utilize model-based control in which the outputs of the sensors 306 are used as inputs to a model that generates an input for the controller 118. Example models include physics-based models, computational fluid dynamics (CFD) models, or finite element analysis (FEA) models. Models may also include artificial intelligence (AI) models, such as expert systems (e.g. forward chained expert systems, backward chained expert systems), neural networks, fuzzy logic systems, state vector machines (SVMs), inductive reasoning systems, Bayesian inference systems, or a combination thereof.

As illustrated, the sensors 306 may be a part of the sensor system 304, which may further include a central computing system having one or more processors and one or more machine-readable, non-transitory, tangible media, where the media store instructions executable by the processor to collect feedback generated by the sensors 306. In certain embodiments, the sensor system 304 may pre-process the feedback (e.g., digitize the feedback, multiplex/demultiplex the feedback) so as to generate data that is analyzed or otherwise further processed by the control system 100 (e.g., controller 118). In still further embodiments, the sensors 306 may directly route feedback to the controller 118 or another portion of the control system 100. In such embodiments, the memory 122 of the control system 100 may include stored instructions (e.g., one or more sets of instructions) for receiving and analyzing the feedback, and for performing the combustion control (e.g., equivalence ratio control) noted above and the diagnostic routines described herein. For instance, the one or more sets of stored instructions may be executable by the processor 120 to determine a fuel/oxidant combustion ratio in each of the combustors 160 by correlating the feedback generated by one or more of the sensors 306 (or sensor arrays) to the operation of a particular one of the combustors 160. Such correlation may enable more precise control over the combustion dynamics within each of the combustors 160, which may enhance the reliability and reproducibility of the SEGR GT system 52 in producing the exhaust gas as a product gas for downstream use (e.g., by the EG supply system 78).

Indeed, in some embodiments, the control system 100 may determine that a particular one of the combustors 160, when operated, generates combustion products that are sensed by a particular subset (e.g., one or more sensors 306) of the sensors 306 placed along or within the turbine section 156. In other words, the control system 100 may, after adjusting one or more operational parameters of a particular turbine combustor 160, identify which sensor 306 or group of sensors 306 registers a response indicative of this adjustment, and may, in some embodiments, identify a position of the sensor 306 or sensors 306. The position may be an axial position, a circumferential position, a radial position, or any combination thereof, of the sensor 306 or sensors 306.

For instance, at a first turbine load (e.g., 100% load), the control system 100 may determine that the third sensor 320 (or set of sensors) senses the combustion products 172 generated by the first combustor 262. In this way, the control system 100 may determine swirl information for the combustion products 172 generated by the first combustor 262 at the first turbine load, where the swirl information includes information related to the progression (e.g., direction of flow) of the combustion products 172 through the turbine section 156, such as including a swirl angle. Similarly, at the first turbine load, the control system 100 may determine that the first sensor 312 (or set of sensors) senses the combustion products 172 generated by the second combustor 264. Swirl information is thereby obtained for the second combustor 264 by identifying the position of the first sensor 312 relative to the second combustor 264.

As set forth above, such correlations may depend on various factors, including the load setting of the turbine, which affects the rotation rate of the turbine stages 174, the temperature/pressure dynamics in the turbine section 156, and so on. In sum, the differences in the turbine load setting may cause a change in the swirl information (e.g., swirl angle) related to each combustor 160. Referring back to the example above, for instance, at a second turbine load (e.g., 90% load), the control system 100 may determine that the second sensor 316 (or set of sensors) senses the combustion products 172 generated by the first combustor 262, and that the fourth sensor 324 (or set of sensors) senses the combustion products 172 generated by the second combustor 264.

In some embodiments, the control system 100 may correlate the feedback generated by the sensors 306 to the operation of a particular combustor 160 by maintaining all of the combustors 160 at a steady state, adjusting a parameter of the particular combustor 160, and identifying a change in feedback generated by one or more of the sensors 306. For instance, in such embodiments, the control system 100 may perform a routine in which the combustors 160 are all operated at a substantially steady state, and may adjust (e.g., increase) an amount of fuel 70 provided to the first combustor 262 using, for example, a fuel level trim valve (e.g., valve 298). Similarly, the amount of oxidant 68 provided to the first combustor 262 may be adjusted (e.g., decreased). In either case, a change in the fuel/oxidant ratio in the first combustor 262 results, which also changes the composition of the combustion products 172 generated by the first combustor 262. In this example, the combustion products 172 may include an increased amount of uncombusted fuel 70. It is also contemplated, however, that the fuel level in the first combustor 262 could be reduced (or the oxidant level increased), in which case the combustion products 172 generated by the first combustor 262 would have an increased amount of oxidant 68.

The sensor system 304 and/or the control system 100 may then monitor the feedback generated by the sensors 306 to identify which of the sensors 306 generates feedback indicative of this change. For instance, referring to the examples above, at the first turbine load, the third sensor 320 (or set of sensors) may register a change in the composition of the combustion products 172 (e.g., an increased concentration of uncombusted fuel) produced by the first combustor 262, while the other sensors 206 (e.g., the first sensor 312, the second sensor 316) generate feedback that remains substantially unchanged. The control system 100 may then determine that at the first load, the operation of the first combustor 262 may be monitored using the third sensor 320 (or set of sensors). It should further be noted that the third sensor 320 or set of sensors may represent a particular circumferential location at a given axial position (e.g., at a particular turbine stage) within the turbine section 156. In other words, the third sensor 320 or set of sensors sense the change in the parameter of the first combustor 262 while other circumferential locations at the same axial position (e.g., particular turbine stage) do not sense the change, or sense the change to a small enough extent that the change falls within what might be characterized as a measurement tolerance.

Figure 6:
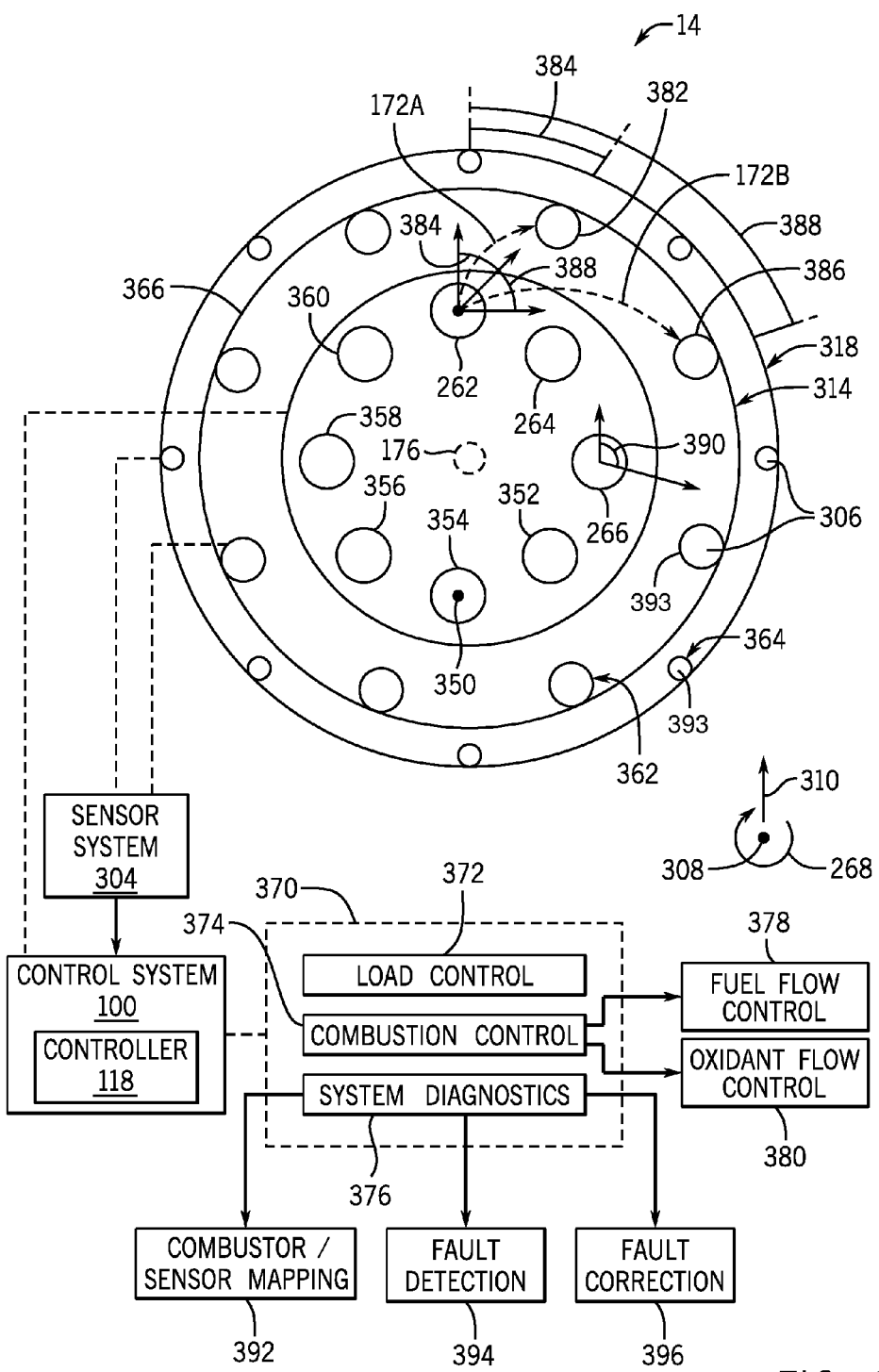
FIG. 6 is a diagram of an embodiment of a turbine combustion system of the gas turbine of FIG. 5, taken along line 6-6 of FIG. 5.

This difference in the manner of sensing changes of the combustion products 172 can be further appreciated with respect to FIG. 6, which is a view along radial line 6-6 (i.e., the radial direction 310 and through the combustor section 154). For the purposes of explanation, certain features of the turbine system 150 are not illustrated in FIG. 6, including various casings and plenums of the turbine section 156, various features of the combustors 160 (e.g., valves, control lines, combustion chambers), turbine blades and wheels, and the like. Indeed, FIG. 6 is merely intended to be a diagrammatical representation of certain features of the SEGR GT system 52 to facilitate explanation of the present embodiments.

As depicted, the combustor section 154 includes a "can annular" arrangement, where the combustors 160 (illustrated as 8 combustors as one example) are arranged circumferentially about the shaft 176 of the turbine system 150. While depicted as each having their longitudinal axes 350 aligned substantially parallel with respect to the axial direction 308 of the turbine system 150, the combustors 160, in some embodiments, may have other configurations. For example, the longitudinal axes 350 of the combustors 160 may have a converging/diverging relationship with respect to one another and with respect to the axial direction 308 of the turbine system 150. In other words, the longitudinal axes 350 of the combustors 160 may be angled (e.g., between 0° and 90°, such as between 10° and 60°, or between 20° and 50°) with respect to the axial direction 308.

The illustrated combustors 160, as noted above, include 8 combustors spread apart from one another in the circumferential direction 268 in a clockwise fashion. In particular, the combustors 160 include the first combustor 262 (e.g., the "N" combustor), the second combustor 264 (e.g., the "N+1" combustor), and the third combustor 266 (e.g., the first combustor (N+2) of the remaining "N+M" combustors, including fourth (N+3), fifth (N+4), sixth (N+5), seventh (N+6), and eighth (N+7) combustors 352, 354, 356, 358, and 360). Similarly, the sensors 306 that detect the combustion products 172 produced by one or more of the combustors 160 are illustrated as including a first annular arrangement 362 positioned at (e.g., immediately upstream, immediately downstream, or within) the first turbine stage 314, and a second annular arrangement 364 positioned at (e.g., immediately upstream, immediately downstream, or within) the second turbine stage 318. The depicted configuration is for illustrative purposes, and is not intended to exclude other arrangements, such as a third annular arrangement at the third turbine section 322 (FIG. 5), a fourth annular arrangement at the fourth turbine section 326 (FIG. 5), and so on.

As illustrated, the first annular arrangement 362 includes a series of the sensors 306 spaced apart annularly (e.g., circumferentially) along a casing 366 of the turbine section 156. It should be noted that references to the "sensors 306," which are depicted diagrammatically as circular elements, may include one sensor at each illustrated position, or a plurality of sensors (e.g., a sensor array) of the same or different types (e.g., CO vs. $O_2$ sensors) occupying a region defined by the area of each circular element. Keeping this in mind, to facilitate explanation, each of the circular elements will be referred to as "sensors" herein.

During operation, the control system 100 may utilize a number of control schemes 370 in order to enable combustion at a desired equivalence ratio within each of the combustors 160. The control schemes 370 may be stored as one or more sets of instructions, such as computer algorithms, that are configured to, when executed by processing devices and associated control features (e.g., valves, actuators), control, monitor, and diagnose/correct various operational variables of the combustors 160. The control schemes 370, which are discussed in detail below, are provided as examples only, and may be implemented on any number of devices, workstations, control modules, and the like.

By way of non-limiting example, as illustrated, the control schemes 370 include, among others, a load control scheme 370 configured to monitor and control the loading/unloading of the turbine system 150, a combustion control scheme 374 configured to control one or more combustion parameters of the combustion process within each combustor 160, and a system diagnostics scheme 376 configured to continuously or intermittently perform diagnostic routines to monitor and diagnose potential issues with the combustion process. Each of the control schemes 370 may be stored on circuitry (e.g., on the memory 122), and may be integral with one another (e.g., as part of one or more applications), or may be separate from one another. In certain embodiments, the control schemes 370 may operate in conjunction with one another, with each of the schemes 370 sharing data/information, inputs/outputs, and so on.

During operation, for example, the turbine system 150 may receive an input indicative of a target load (e.g., based on electricity usage from an electrical grid to which the gas turbine system 150 is synchronized, and/or based on a target exhaust output). The load control 372 may determine, based on the target load, appropriate operating parameters for various sections of the turbine system 150, such as the combustor section 154. The load control 372 may provide certain combustion parameter targets (e.g., target heat release by the combustors 160) to the combustion control 374, which may, in turn, adjust one or more operational parameters of the combustion process performed by one or more of the combustors 160. As illustrated, the combustion control 374 may include routines for fuel flow control 378, oxidant flow control 380, or a combination thereof. As discussed above, the fuel flow control 378 may adjust a flow of the fuel 70 to the combustors 160 (e.g., using fuel level trim valves such as 298, 300, 302), while the oxidant flow control 380 may adjust a flow of the oxidant 68 to the combustors 160 (e.g., using valves 270, 274, 278 or other flow adjusting mechanisms, such as compressors). Whether the fuel flow and/or oxidant flow is the parameter adjusted may depend on a number of factors. For instance, the oxidant flow may be adjusted based on the target load, while the fuel flow is adjusted in response to the oxidant flow change to maintain a desired combustion equivalence ratio. As noted above, the reverse control may also occur, where the fuel flow follows the load, and the oxidant flow is controlled in response to the fuel flow.

When operating, as set forth above, each combustor 160 produces combustion products 172 as a result of the combustion process. As depicted by the combustion products 172 released from the first combustor 262, the gaseous combustion products 172 may swirl due to the spinning motion of the turbine stages—in this example a clockwise spinning motion (though the spinning motion may be counterclockwise instead). At a first turbine load, for example 80% load, the combustion products 172 may have a first swirl path, depicted as arrow 172A. The swirl path may include a number of revolutions about the axis defined by the shaft 176, a single revolution about the axis defined by the shaft 176, or a part of a revolution about the axis defined by the shaft 176, that the combustion products 172 experience before reaching a particular sensor 306 or set (e.g., section) of sensors.

At the first turbine load, the combustion products may be detected by a first sensor 382 of the first turbine stage 314. Because the swirl path 172A causes the combustion products 172 to deviate from the longitudinal axis 350 of the first combustor 160, an angle 384 is formed between the axis 350 and the circumferential position of the first sensor 382. This angle 384 may be referred to as a swirl angle.

It should be noted that the swirl of the combustion products 172 may be different depending on the manner in which the combustion products 172 are sensed. For example, constituent sensors (e.g., $CH_4$, $CO$, $O_2$ sensors) may have one swirl angle for the combustion products 172 produced by a particular combustor 160, while temperature sensors may have a different swirl angle for the same combustion products 172. In other words, gas constituent swirl angles may not always (but sometimes will) match gas temperature swirl angles for a particular combustor.

As the turbine load is increased, for example to a second turbine load of 100%, the combustion products 172 may have a second swirl path caused by the increased rotation rate of the turbine stages. This second swirl path, which is for illustrative purposes only, is depicted as arrow 172B. In this embodiment, a second sensor 386 of the first turbine stage 314 may detect the combustion products 172, indicative of a second swirl angle 388. Each of the combustors 160 may have respective first swirl angles at the first turbine load and second swirl angles at the second turbine load. Indeed, the swirl angle associated with each of the combustors 160 enables the control system 100 (and/or an operator) to determine which of the sensors 306 (or collection of sensors) in the sensor array (e.g., the sensors at each turbine stage) detect the combustion products 172 from a particular combustor. In the example described above, for instance, the first swirl angle 384 associated with the first combustor 262 at the first turbine load level would indicate that the combustion products 172 of the first combustor 262 can be detected using the first sensor 382 of the first turbine stage 314.

In certain embodiments, the combustors 160 may be firing intermittently, or substantially continuously. Because the combustors 160 discharge the combustion products 172 into a common area (e.g., the turbine section 156), the combustion products 172 from a particular one of the combustors 160 may be difficult to identify. Indeed, the combustion products 172 from a number of combustors 160 may mix and may be detected by a common sensor. However, because the combustors 160 discharge at different circumferential locations within the common area (e.g., the turbine section 156), the combustion products 172 from different combustors 160 may not contribute equally to each sensor's response. For example, at the first turbine load, the combustion products 172 from the first combustor 262 may have a greater contribution to the response of the first sensor 382 at the first turbine stage 314 compared to the combustion products 172 generated by the third combustor 266, which may have a swirl angle 390 that causes the combustion products 172 to swirl away from the first sensor 382.

Therefore, the control system 100 may utilize this relationship between the sensor position, the swirl angle, and each combustor 160 to monitor the combustion products 172 generated by each combustor 160. For example, the system diagnostics 376 may include routines for performing mapping 392—where the position of each of the combustors 160 is correlated to a particular sensor or sensor array location. The combustor/sensor mapping 392 may take into account the positions of the combustor 160 and the sensors/sensor array, the type of sensor, the sensed parameter, and the turbine load, among other parameters.

In certain situations and at different loads, as set forth above, the swirl angle may not be known for the combustors 160. Accordingly, because the combustors 160 are all generally operating at the same combustion parameters (e.g., the same combustion equivalence ratio), it can be difficult to correlate particular sensors 306 to particular combustors 160. In accordance with present embodiments, the control system 100 may utilize the combustion control 374 to adjust an operating parameter of a particular combustor 160 to identify which of the sensors 306 generates a response indicative of the parameter adjustment.

For example, to map the first combustor 160 to one or more of the sensors 306, the control system 100 may adjust a flow of the fuel 70 to the first combustor 306 (while holding fuel flow to the other combustors 160 substantially the same), and may monitor the response of the sensors 306 to determine which sensor generates a response indicative of an adjusted fuel to oxidant ratio. By way of example, the flow of the fuel 70 may be increased to the first combustor 262, and a third sensor 393 at the first turbine stage 314 may register the adjustment (e.g., via feedback indicative of a higher-than-expected fuel to oxidant ratio in the combustion products 172).

Similar adjustments may be made to other parameters, such as the heat release of the first combustor 262. For instance, the flow of both the fuel 70 and the oxidant 68 may be increased to the first combustor 262. While this may not necessarily result in a change in the fuel to oxidant ratio, it may result in increased amounts of combustion in the first combustor 262, which causes the combustion products 172 released by the first combustor 262 to be hotter than before the adjustment was made. Whichever of the sensors 306 registers this temperature change may be correlated (e.g., mapped) to the first combustor 262. As noted above, the temperature mapping may not necessarily be the same as for constituent mapping (i.e., mapping based on combustion gas composition). This process may be repeated at different loads and for the different combustors 160 until all of the combustors 160 have been mapped at the different loads. In other words, the mapping process produces a series of combustor/sensor maps correlating particular sensors 306 to particular combustors 160 at each turbine load.

Other changes to operating parameters are presently contemplated for mapping purposes. For example, a diluent composition may be adjusted for a particular combustor to determine which sensor 306 or groups of sensors 306 produce a response indicative of the change. By way of non-limiting example, the change in the diluent may include an increase in the concentration (e.g., partial pressure) of components such as water, nitrogen, steam, or the like. The sensor(s) 306 that register this change can then be correlated back to the adjusted combustor 160.

The control system 100 may periodically perform diagnostic routines to verify that the feedback generated by the sensor system 304 is accurately mapped. In such routines, the control system 100 may perform similar adjustments as described above, and may compare the feedback so generated to the existing combustor/sensor maps. Comparisons such as these may be performed using a fault detection scheme 394, where certain results of the comparison may be indicative of particular faults in the combustor section 154, the sensor system 304, or other section or system of the SEGR GT system 52.

Comparisons performed for fault detection may include, but are not limited to, comparing previously mapped positions (e.g., from an existing combustor/sensor map) to new position feedback, comparing the time between the adjustment of the combustor parameter and the sensor detection, referred to as a delay time, and a previous delay time, and comparing a measured fuel to oxidant ratio to a previous fuel to oxidant ratio, among others. Based on the comparisons, the fault detection scheme 394 may enable the identification of potential system faults. In embodiments where the faults can be corrected/addressed by the control system 100 automatically (e.g., via valve adjustments, using different sensors 306 for particular combustors 160), the control system 100 may automatically perform a fault correction scheme 396. Example fault indication and corrections that may be performed by the control system 100 are discussed in further detail below with respect to FIG. 9.

Figure 7:
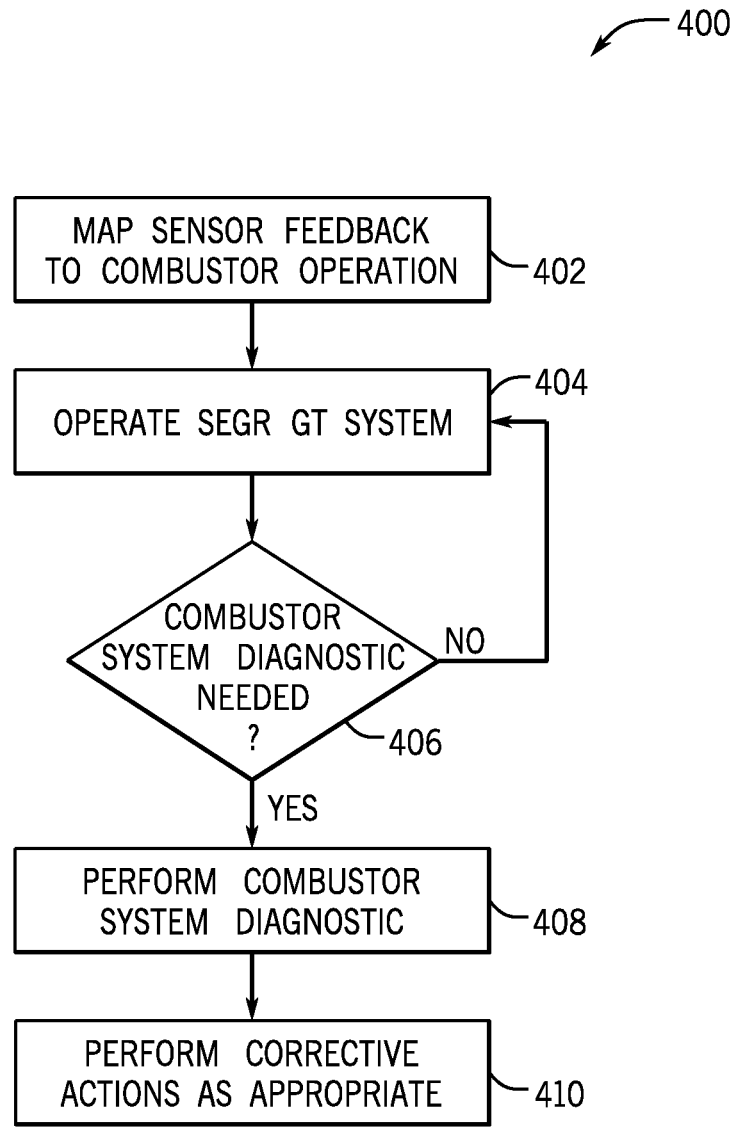
FIG. 7 is a flow chart of an embodiment of a process of operating the stoichiometric exhaust gas recirculation gas turbine (SEGR GT) system and monitoring turbine combustor operation.

FIG. 7 is a process flow diagram depicting a method 400 that the control system 100 may perform at startup, during steady state operation, or during any other period of operating the SEGR GT system 52. In particular, the method 400 represents a general process flow that may be performed by the control system 100, where the control system 100 maps sensor response to combustors, and performs periodic diagnostics as appropriate. By way of non-limiting example, the method 400 may correspond to any one or a combination of acts performed in the load control, combustion control, and system diagnostics schemes 372, 374, 376 discussed above.

The method 400 includes mapping (block 402) feedback from one or more of the sensors 306 (e.g., a single sensor 306 or an array of sensors 306) to the combustor section 154 operation. As discussed in detail below with respect to FIG. 8, the mapping process in accordance with block 402 may include correlating sensor response to each combustor 160 as the operation of each combustor 106 is individually adjusted.

Before, during, or subsequent to the acts of block 402, the method 400 further includes operating (404) the SEGR GT system 52, for example at a steady state or in a manner that enables the load on the SEGR GT system 52 to be adjusted. For example, the SEGR GT system 52 may be loaded and unloaded based on electrical power demands from an electrical grid (e.g., of a municipality), based on a demand for exhaust gas from an enhanced oil recovery application, or any combination of these and other such applications. For example, in embodiments where the SEGR GT system 52 is synchronized to a grid, the system 52 may be loaded (e.g., the load on the GT system 52 may be increased) when the grid "droops" below a certain level.

The control system 100 may determine (query 406), for example periodically or as a result of sensor feedback, whether the system 100 should perform a diagnostic routine (e.g., system diagnostics scheme 376). For example, the control system 100 may determine, based on feedback from one or more sensors 306, that the exhaust gas 66 is not within predetermined specifications (e.g., outside of a desired fuel to oxidant ratio or not at a desired temperature and/or pressure). As another example, the control system 100 may perform diagnostics at regular intervals, such as once a day, once a week, once a month, or any other interval.

In embodiments where the control system 100 determines that no diagnostic is needed, the method 400 continues operation of the SEGR GT system according to block 404. In other embodiments, the control system 100 may determine that one or more diagnostic routines should be performed. In such embodiments, the method 400 may progress to performing (block 408) a combustor system diagnostic.

In accordance with present embodiments and as discussed in detail below, the combustor system diagnostic may include individually perturbing the operation of one of the combustors 160, while the remaining combustors 160 are kept at a relatively steady state of operation (e.g., a steady combustion equivalence ratio). The control system 100 may monitor which sensors detect this change, and may provide certain types of feedback (e.g., to a user) as a result of this monitoring. For example, the control system 100 may provide feedback to a user, or feedback as an input to a subsequent computer-implemented algorithm, as to whether the particular combustor that was adjusted is working properly and/or whether the sensors previously mapped to the combustor 160 are still appropriate. The acts of block 408 may perform the same or similar functions for one, some, or all of the combustors 160 in the combustor section 154. Further, the combustor system diagnostic performed in accordance with block 408 is not limited to the combustor diagnostics disclosed herein. Indeed, the diagnostics performed in accordance with block 408 may include the combustor diagnostic routines described herein in addition to other routines.

In response to various indications generated during the diagnostic routine, the method 400 may also include performing (block 410) corrective actions as appropriate. For example, the control system 100 may adjust a fuel flow and/or oxidant flow to a particular combustor 160 if the combustor 160 generates combustion products 172 having parameters outside of a given specification, or the control system 100 may stop one or more of the combustors 160 from operating if the feedback indicates that there are combustor-related faults. The control system 100 may also provide feedback to a user that the combustor section 154 is in need of servicing.

Similarly, if one or more sensors 306 are not properly responding, the control system 100 may cease using the non-operational or off-spec sensors, or may adjust the correlation of one or more sensors to particular combustors depending on the sensor response. The control system 100 may also provide an indication to a user that one or more of the sensors 306 may need replacing.

Figure 8:
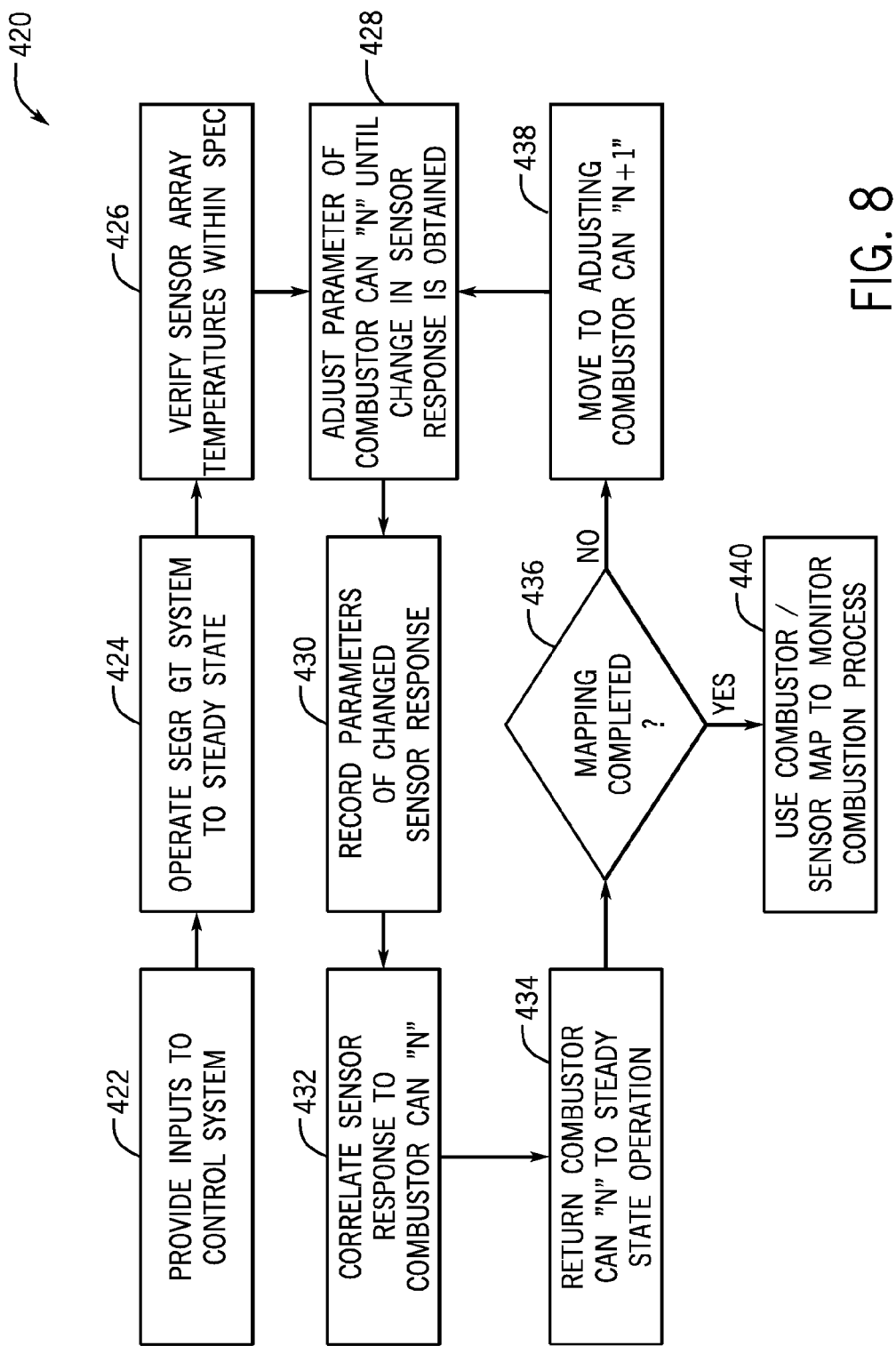
FIG. 8 is a flow chart of an embodiment of a method for generating a combustor/sensor map for performing diagnostics on the system of FIG. 5.

As noted above, the control system 100 may perform one or more combustor/sensor mapping schemes 392, for example to generate a combustor/sensor map for each turbine load at which diagnostics may be performed. The mapping may be performed for any number of incremental changes in load, such as between 2 and 1000 incremental changes, between 5 and 500 incremental changes, between 10 and 100 incremental changes, and so on. FIG. 8 is a process flow diagram depicting a combustor/sensor mapping method 420 for generating one or more combustor/sensor maps.

In the illustrated embodiment, the method 420 includes providing (block 422) a plurality of inputs to the control system 100, and in particular to one or more computer-implemented programs/applications that perform the method 420. The plurality of inputs may include the respective locations, sizes, types of the sensor array within the turbine section 156 (or other area). The inputs may also include feedback generated from the fuel analysis system 288 (e.g., the relative concentrations (e.g., partial pressures) of each fuel component within the fuel flow), the turbine load points to be tested (e.g., for generating maps at a series of turbine load points), oxidant flow information (e.g., flow rates, pressures, oxidant composition information), and similar information. In one embodiment, it may be desirable for the fuel supply to be stable so as to avoid perturbations to the combustion process, which may cause unreliable feedback to be generated.

Once the control system 100 gathers/receives the inputs according to block 422, the method 420 includes operating (block 424) the SEGR GT system at a steady state of combustion (e.g., steady combustion equivalence ratios for all combustors, steady turbine load point). Indeed, it may be desirable to operate the SEGR GT system 52 in this manner so as to avoid changes to the swirl angles and other flow-related parameters that will be calculated and used for combustor/sensor correlation at subsequent steps in the method 420.

The method 420 may also include verifying (block 426) that the sensor array temperatures are within specified ranges. Indeed, because the sensor response may, at least partially, depend on the temperature of their operation, it may be desirable to ensure that the temperatures of the sensors 306 remain substantially unchanged. The sensor temperatures may be directly measured (e.g., via thermocouples, thermistors), or the control system 100 may monitor feedback indicative of their temperatures (or at least that their temperatures are steady), such as a duty cycle of a heat exchange fluid used to maintain the temperature of the sensors 306.

Once the SEGR GT system 52 is operating at a steady state, perturbations to the system, such as perturbations to one of the combustors 160 of the combustor section 160, may be detected and correlated back to the particular combustor 160. Thus, the method 420 includes adjusting (block 428) a parameter of one of the combustors 160 (sometimes referred to as a combustor "can") until a change in the response of one or more sensors 306 is obtained. For the purposes of discussion, this is referred to as adjusting an operating parameter of combustor can "N," with "N" indicating any particular one of the combustors 160. After the particular one combustor 160 is adjusted, as discussed below, the method 420 progresses to performing the steps described herein as moving to combustor "N+1," i.e., the next combustor 160.

The operating parameters that may be adjusted are not limited to fuel flow or oxidant flow. Rather, any operational parameter that, when adjusted, can result in a detectable change in the combustion products 172 (e.g., a change in their respective temperature, pressure, flow rate, composition) may be adjusted in accordance with block 428. For example, the fuel flow, oxidant flow, exhaust gas diluent flow, other diluent flow (e.g., steam injection, water injection, nitrogen injection), firing temperature, ignition rate, and others, of the combustor 160 may be adjusted.

The response of the one or more sensors 306 may be recorded (block 430). For example, the output of the sensor(s) 306 (e.g., a measured fuel to oxidant ratio, temperature, pressure) may be recorded, as well as the time delay between the time at which the operating parameter was adjusted and the time at which the change was detected by the sensor(s) 306.

The response is then correlated (block 432) back to the combustor can "N." For example, the position of the sensor(s) 306 that detected the change may be correlated back to the position of the combustor can "N" to generate a swirl angle (e.g., swirl angle 384) at the particular turbine load point. The time delay (or "transport delay") may also be correlated to the particular combustor 160 and sensor(s).

During or after the acts of blocks 430 and 432, the control system 100 may return (block 434) the combustor can "N" to a similar operating state as the remaining turbine combustors 160 (e.g., the combustion parameters at block 424). The control system 100 may also determine (query 326) whether the mapping process has been completed. For example, the control system 100 may determine whether the desired number of combustors 160 has been mapped to a respective sensor/sensor array, and/or whether combustor/sensor maps have been generated for the desired turbine load points (e.g., 80% load, 90% load, 100% load).

In embodiments where the mapping is not completed, the method 420 may move to the combustor can "N+1," i.e., the next combustor 160 in the combustor section 154 (or any other combustor 160 in the section) (block 438). For example, in embodiments where the combustor can "N" is the first combustor 262, the method 420 may progress to the second combustor 264, or the third combustor 266, the fourth combustor 352, or any other combustor 160, in block 438.

In embodiments where the mapping is complete, such as complete for a given turbine load point, or complete for all turbine load points, the method 420 progresses to using (block 440) the combustor/sensor map(s) for monitoring the combustion process. As discussed below with respect to FIG. 9, these maps may be utilized to periodically (e.g., per a schedule or as a result of particular feedback) monitor and diagnose potential issues with the combustor section 154 and/or the sensor system 304.

Figure 9:
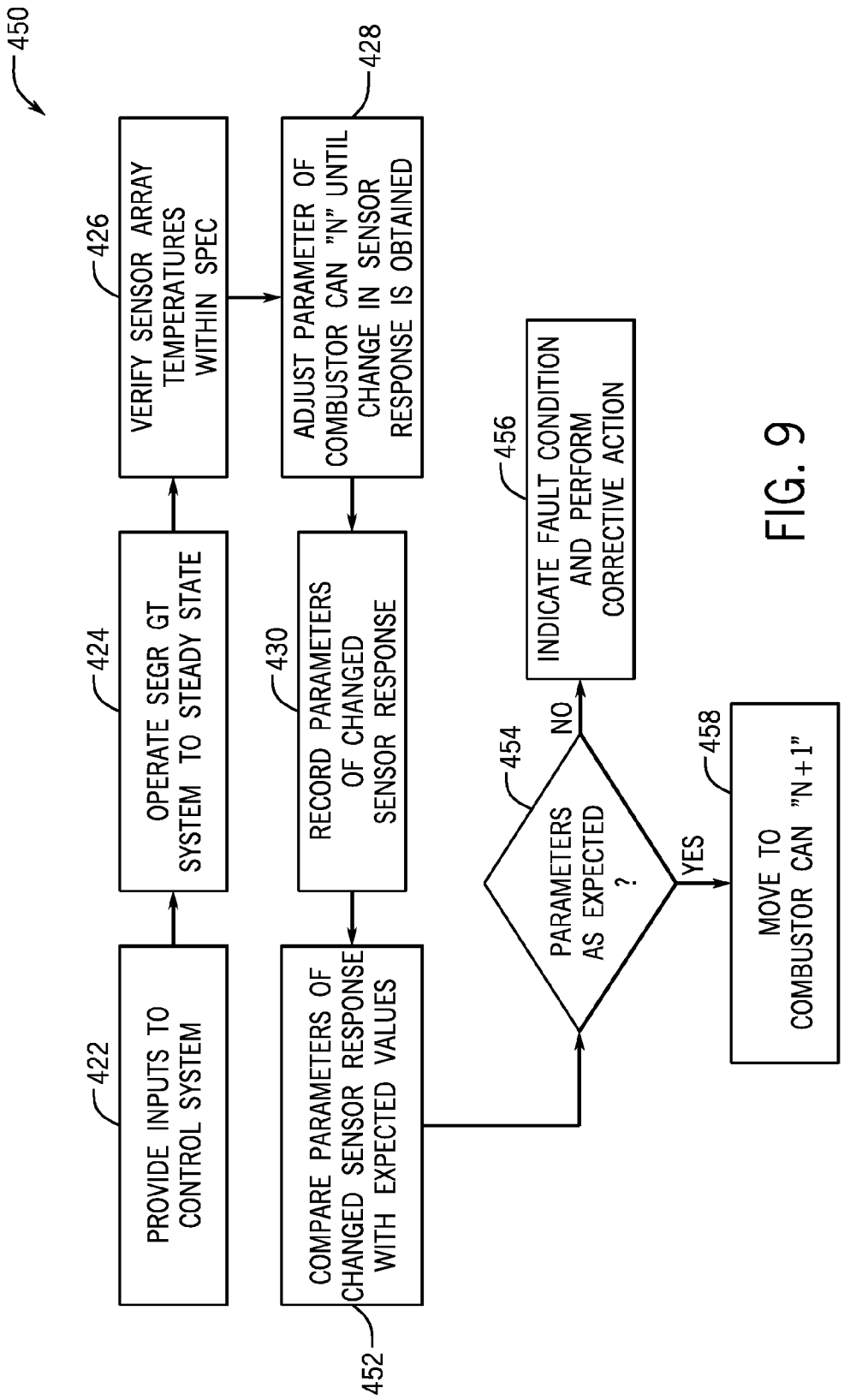
FIG. 9 is a flow chart of an embodiment of a routine for performing diagnostics on the turbine combustor system of FIG. 5.

FIG. 9 depicts a process flow diagram illustrating an embodiment of a method 450 for performing diagnostics on the turbine section 154 and the sensor system 304. As illustrated, the method 450 includes many of the processes described above with respect to the method 420 in FIG. 8, including providing appropriate inputs to the control system 100 (block 422), operating the SEGR GT system 52 at a steady state (block 424) (e.g., a substantially steady state, such as within an equivalence ratio of combustion varying by no more than between 0% and 5%), verifying sensor temperatures (block 426), adjusting a parameter of the combustor can "N" (block 428), and recording parameters of the changed sensor response (block 430).

In the method 450, once the sensor response is recorded for the particular combustor adjustment, the control system 100 compares (block 452) the newly recorded sensor response to the old sensor response used to generate the combustor/sensor map for the particular turbine load point, referred to as "expected values" for the response. For example, the control system 100 may compare the newly recorded transport delay to the expected transport delay, the newly recorded fuel to oxidant ratio to the expected fuel to oxidant ratio, the newly recorded sensor position to the expected sensor position, and the like. In situations where multiple sensors respond, similar comparisons may be made based on sensor groupings, based on individual sensors of a group of sensors, or any combination thereof. Furthermore, the control system 100 may also determine whether the sensor response is homogeneous across all sensors of a group of sensors. Such detection enables the control system 100 to perform the combustor diagnostics while also identifying potential issues with individual sensors. As noted above with respect to FIG. 6, such comparisons may be performed by the system diagnostics scheme 376, and in particular routines including fault detection 394.

The control system 100, based on the comparison, may determine (query 454) whether the newly recorded sensor response(s) are as expected (e.g., within a predetermined tolerance of the expected values). In embodiments where the parameters are not as expected, the method 450 progresses to indicating (block 456) a potential fault condition and/or performing a corrective action as appropriate. Again, the particular nature of the deviation from the expected value may provide feedback as to the nature of a potential fault, and the manner in which the potential fault may be corrected for diagnosis of a condition of the sensors 306 and/or the turbine combustors 160. As illustrated below, TABLE 3 depicts some non-limiting examples of fault indications based on comparisons performed by the system diagnostics 376, and potential fault corrections that result.

TABLE 3

| Comparison Result | Fault Indication | Fault Correction |
| --- | --- | --- |
| F/O ratio is not as expected for Sensor "L" | Shift in Sensor "L" operation | Use adjacent sensors for F/O ratio determination for combustor |
| F/O ratio is not as expected for a plurality of sensors | Multiple sensor faults/ shift in operation and/ or combustor fault | Indicate multiple sensor faults and/or potential combustor fault and/or adjust combustor operation |
| Transport delay is above upper spec limit (USL) for Sensor "L" | Degraded state of Sensor "L" | Use adjacent sensors for F/O ratio determination for combustor |
| Transport delay is above USL for multiple sensors | Multiple sensors in degraded state and/or combustor fault | Indicate multiple sensor faults and/or potential combustor fault |
| Responding sensor(s) not as expected for particular combustor | Poor fit between swirl angle and turbine load for combustor | Apply correction to combustor swirl angle |

As illustrated above in TABLE 3, certain results of the comparison performed in accordance with block 452, when indicative of a potential fault, may result in various indications being provided by the control system 100. For example, the indications may be user-perceivable (e.g., auditory, visual, tactile), or may be provided as inputs to subsequent routines (e.g., for fault correction 396), or a combination thereof. As illustrated above, when the fuel to oxidant ratio is the compared parameter that is not as expected for a single sensor (e.g., within a predetermined tolerance of the expected value), listed as "Sensor L," the control system 100 may provide an indication that there has been a shift in the sensor's capabilities or response. Such a comparison may, in some embodiments, account for an expected shift over time in the operation of the sensor (e.g., as the sensor slowly becomes degraded). Indeed, based on the shift, the control system 100 may determine the degradation level of the sensor. In such instances, the control system 100 may automatically utilize sensors that are positioned adjacent to the faulty sensor for readings related to the combustor can "N."

On the other hand, in situations where several of the sensors are not responding as expected for fuel to oxidant ratio measurements, the control system 100 may provide an indication that there are multiple sensor faults, and/or that there is a potential fault in the combustor can "N," such as a potential air leak from a faulty/broken seal, or that the parameters for the particular combustor have simply changed. In such embodiments, the control system 100 may shut down the operation of the combustor can "N," or may provide an indication to an operator that the combustor section 154/sensor system 304 may be in need of servicing. In other embodiments, the control system 100 may schedule a servicing (e.g., within a servicing database) for a future time. In still further embodiments, the combustor's operation may be adjusted according to the results of the comparison.

Because certain types of sensors exhibit increased delays when they are degraded (e.g., just before failure), when the transport delay is above an upper spec limit (USL) for the sensor "L," the control system 100 may provide an indication that the sensor "L" is in a degraded state. Indeed, the transport delay may be correlated to a particular degradation level for the sensor. In embodiments where the USL is exceeded for the sensor "L," the control system 100 may use adjacent sensors for the fuel to oxidant ratio determination relating to the combustor can "N."

If the transport delay for multiple sensors is above their respective USLs, the control system 100 may provide an indication that there are multiple degraded sensors, and/or that there is a potential combustor fault. In such embodiments, the control system 100 may shut down the operation of the combustor can "N," or may provide an indication to an operator that the combustor section 154/sensor system 304 may be in need of servicing.

As another example shown in TABLE 3, the position of the responding sensors may not be the expected position. In other words, the mapped sensors for which a response was expected may not correspond to the sensors that exhibit the response. In such embodiments, the control system 100 may provide an indication that the swirl information (e.g., swirl angle) for the combustor can "N" at the particular turbine load point is inaccurate, and may take corrective action by applying a correction to the swirl information associated with the combustor can "N" at the turbine load point.

It should be noted that the examples provided above are intended to be exemplary only, and are not intended to limit the scope of parameters that are monitored and adjusted by the control system 100. Indeed, any number of parameters relating to the combustor operation may be monitored, adjusted, diagnosed, or corrected, or any combination thereof, according to the present embodiments.

In embodiments where all of the parameters are as expected or within a tolerance of the expected values (a "yes" answer to query 454), the method 450 progresses to adjusting the next combustor can, combustor can "N+1" as described above with respect to method 420. In other words, after the combustor can "N" is diagnosed, the method 450 progresses to adjusting the next combustor can (can "N+1") and comparing the sensor responses associated with the adjustment to the combustor can "N+1" to expected values for the combustor can "N+1" as determined when the combustor/sensor map was generated. Indeed, the method 450 may be repeated as often as appropriate, and for as many of the combustors 160 in the combustor section 154 as appropriate.

It should be noted that the present approaches to performing combustor and sensor diagnostics discussed above may benefit from the use of specific types of sensors, and in particular, specific types of oxygen sensors. For example, as noted above, in certain embodiments the gas turbine system 150 may be operated under stoichiometric conditions of combustion, such as at equivalence ratios ranging between 0.95 and 1.05.

Figure 10:
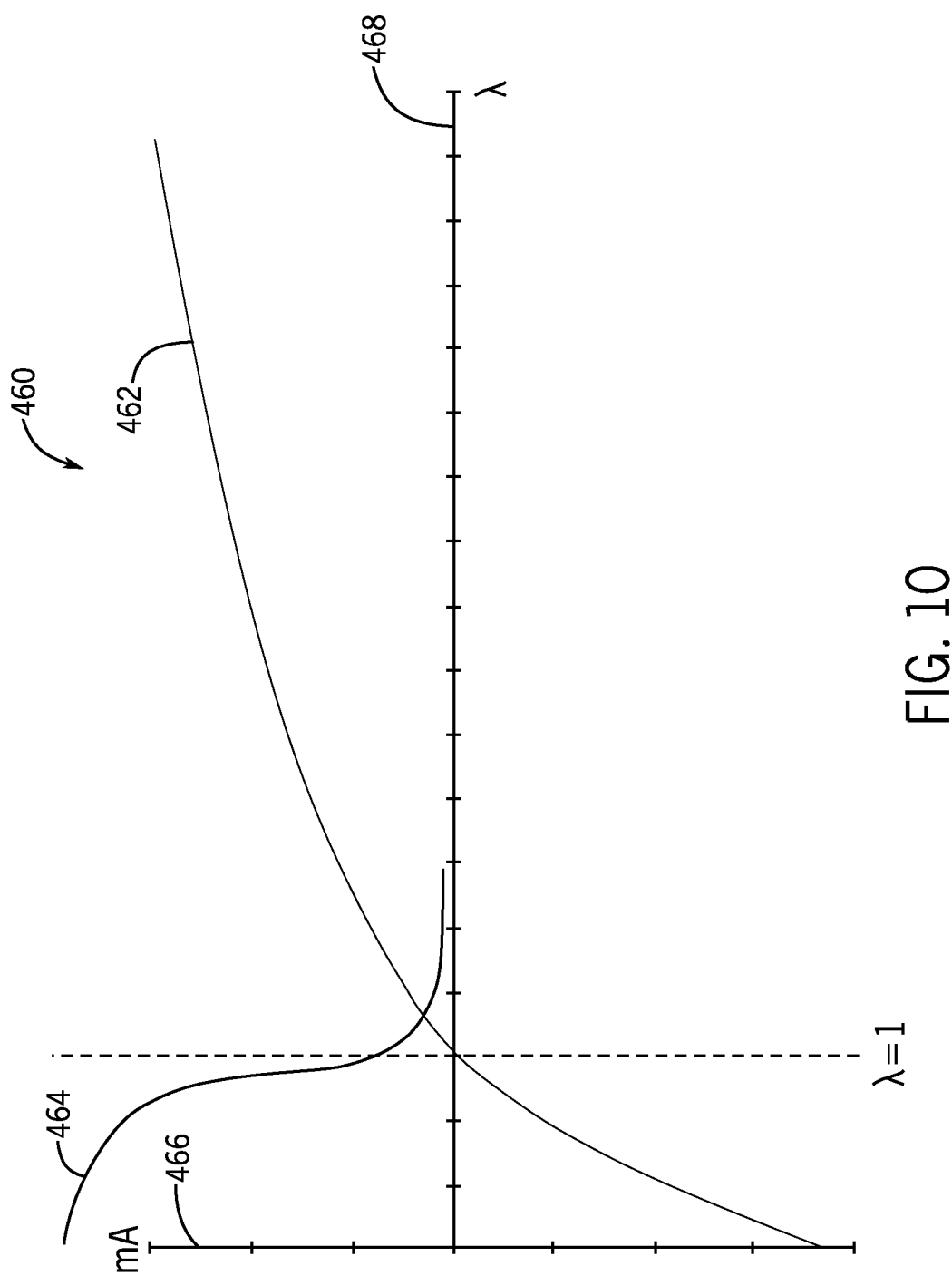
FIG. 10 is a combined plot of a wideband oxygen sensor response and a narrowband oxygen sensor response as a function of lambda.

As noted above with respect to FIG. 6, it may be desirable for the sensors 306 to be wideband oxygen sensors, as opposed to narrow band oxygen sensors, when the gas turbine system 150 is operated under stoichiometric conditions of combustion. This may be further appreciated with reference to the graph of FIG. 10. In particular, FIG. 10 is an example combined plot 460 of a wideband oxygen sensor response curve 462 (e.g., a UEGO sensor) and a narrowband oxygen sensor response curve 464 (e.g., a HEGO sensor). The response curves 462, 464 are plotted as response 466 as a function of lambda 468 (air-fuel ratio), which is the reciprocal of the equivalence ratio, or phi. Thus, lambda is the ratio of the stoichiometric oxidant/fuel ratio relative to the ratio of the actual oxidant/fuel ratio. In this way, a lambda of greater than 1.0 results in a fuel-lean combustion of the fuel and oxidant whereas a lambda of less than 1.0 results in a fuel-rich combustion of the fuel and oxidant. In contrast, a lambda of 1.0 results in combustion that is neither fuel-rich nor fuel-lean, thereby substantially consuming all of the fuel and the oxidant in the combustion reaction. It should be noted that the curves 462, 464 are merely examples presented to facilitate discussion, and are not intended to limit the scope of the present disclosure.

In wideband-type oxygen sensors, an electronic circuit controls pump flow through an oxygen pump cell in such a way that the composition of gas within or proximate a diffusion gap remains constant with a lambda of approximately one. This is measured by a Nernst cell. With respect to the operation of the wideband sensor, if the combustion products 170 being sensed by the wideband sensor are lean in oxygen, the oxygen pump cell of the wideband sensor is activated to pump oxygen out the diffusion gap of the sensor. If the combustion products 170 are rich in oxygen, the direction of flow is reversed so that the cell pumps oxygen into the diffusion gap. The flow to and from the pump is proportional to the oxygen concentration of the combustion products 170. Accordingly, the response for the wideband sensor is typically provided as a level of current, which is generally measured in milliamps.

As shown in FIG. 10, for values of lambda greater than one (e.g., positive), the pumping current for the wideband oxygen sensor response curve 462 is greater than zero and for lambda values less than one, the pumping current for the wideband oxygen sensor response curve 462 is less than zero (e.g., negative). Further, the wideband oxygen sensor response curve 462 extends over a wide range of lambda values, where the response of the pumping current is gradual as the wideband oxygen sensor response curve 462 moves from negative to positive regions of the pumping current. Thus, small changes in the value of lambda may result in relatively small changes in the value of the pumping current for wideband oxygen sensors.

In contrast, narrowband oxygen sensors, such as HEGO sensors, may exhibit rapid or large changes in pumping current near values of lambda of approximately one. Indeed, as depicted in FIG. 10, the narrowband oxygen sensor response curve 464 is similar to a step function in the region proximate lambda values of 1 (stoichiometric operation). In the context of the present embodiments, since the value of lambda may be used by the control system 100 to maintain stoichiometric operation of the gas turbine engine 150, wideband oxygen sensors may be better-suited for enabling control of SEGR gas turbine systems 52. Indeed, wideband oxygen sensors (e.g., UEGO sensors) may provide more accurate values of oxygen concentrations while narrowband oxygen sensors may be used to merely indicate a presence or absence of oxygen at a particular concentration.

Further, in the context of the present approaches, the relatively gradual response across a wide range of lambda values may enable a greater degree of information to be obtained during diagnosis. For example, because the response of the wideband oxygen sensors may be more accurate than narrowband oxygen sensors (especially at or around stoichiometric conditions), the diagnostic routines of the present disclosure may additionally provide data relating to a degree of sensor degradation or a degree of some other system fault, such as a degree of seal leakage. Accordingly, in any of the methods described above, the diagnostic routines may also, in addition to indicating the presence of a potential fault condition, may indicate a degree of the potential fault condition, and may also make particular determinations and take particular types of control or corrective actions based on the degree of the potential fault condition.

For example, if during the course of a diagnostic routine the control system 100 determines that there is a potential fault in one of the sensors 306, the control system 100 may also determine the degree to which the sensor's respective response is incorrect (e.g., by calculating a deviation, such as a standard deviation from an average response of other sensors 306 that also detect a change in a parameter of the combustion products 170). The deviation from the average (or other type of deviation) may determine whether the sensor 306 should be replaced, or whether the sensor 306 is still able to be used for a particular amount of time. Similar types of determinations may be made for other system components, such as seals within fuel and/or oxidant supply lines, seals within the turbine combustor section 154, and the like.

While the use of wideband oxygen sensors may be desirable for the reasons set forth above, it should be noted that the present disclosure also encompasses the use of narrowband oxygen sensors to in performing the routines described herein. Thus, in embodiments where the sensors 306 are oxygen sensors, the sensors 306 may all be wideband sensors (e.g., UEGO sensors), may all be narrowband sensors (e.g., HEGO sensors), or may be any combination of wideband and narrowband sensors (e.g., regions of only UEGO sensors, regions of only HEGO sensors, regions having UEGO sensors paired with HEGO sensors).

ADDITIONAL DESCRIPTION

As set forth above, the present embodiments provide systems and methods for performing diagnostics on a turbine combustor section of a gas turbine system. It should be noted that any one or a combination of the features described above may be utilized in any suitable combination. Indeed, all permutations of such combinations are presently contemplated. By way of example, the following clauses are offered as further description of the present disclosure:

Embodiment 1

A system, comprising: a gas turbine system, comprising: a turbine combustion system comprising a plurality of turbine combustors each configured to combust a fuel/oxidant mixture to produce combustion products; a turbine driven by the combustion products produced by the turbine combustion system; a plurality of sensors positioned downstream of the turbine combustion system and configured to monitor one or more parameters of the combustion products; and a control system comprising one or more non-transitory machine-readable media collectively storing one or more sets of instructions executable by a processor to perform a turbine combustion system diagnostic routine comprising: adjusting an operational parameter of a first turbine combustor of the plurality of turbine combustors to cause a change in the combustion products produced by the first turbine combustor; identifying respective sensor responses of one or more first sensors of the plurality of sensors that detects the change in the combustion products; correlating the respective sensor responses with the first turbine combustor; and diagnosing a condition of the one or more first sensors, the first turbine combustor, or a combination thereof, based on the respective sensor responses.

Embodiment 2

The system of embodiment 1, wherein the turbine combustion system diagnostic routine comprises comparing the respective sensor responses to an expected sensor response to diagnose the condition, and wherein the control system performs a corrective action, provides a user-perceivable indication, or a combination thereof, if at least one of the respective sensor responses and the expected sensor response are not within a predetermined tolerance of one another.

Embodiment 3

The system of embodiments 1 or 2, wherein adjusting the operational parameter of the first turbine combustor of the plurality of turbine combustors comprises adjusting a fuel/oxidant ratio in the first turbine combustor by adjusting a fuel level trim valve such that the expected sensor response is indicative of a particular fuel/oxidant ratio, wherein when a first sensor response of a single sensor of the one or more first sensors is not within the predetermined tolerance of the particular fuel/oxidant ratio, the control system uses a sensor of the one or more first sensors that is adjacent to the single sensor to monitor the fuel/oxidant ratio, provides a fault indication of the single sensor, or a combination thereof.

Embodiment 4

The system of any preceding embodiment, wherein adjusting the operational parameter of the first turbine combustor of the plurality of turbine combustors comprises adjusting a fuel/oxidant ratio in the first turbine combustor by adjusting a fuel level trim valve such that the expected sensor response is indicative of a particular fuel/oxidant ratio, wherein when the respective sensor responses of all of the one or more first sensors is not within the predetermined tolerance of the particular fuel/oxidant ratio, the control system, provides a fault indication of the multiple sensors, provides a fault indication of the first turbine combustor, adjusts the operation of the first turbine combustor, or any combination thereof.

Embodiment 5

The system of any preceding embodiment, wherein comparing the respective sensor responses to the expected sensor response comprises comparing actual respective positions of the one or more first sensors having the respective sensor response to an expected position of sensors expected to have the respective sensor response, and wherein the control circuitry uses the actual position of the sensors having the respective sensor response when the actual position and the expected position are not the same.

Embodiment 6

The system of any preceding embodiment, wherein the turbine combustion system diagnostic routine comprises: using the actual position of the one or more first sensors to generate swirl angle information of combustion products produced by the first turbine combustor; and comparing the generated swirl angle information to expected swirl angle information for the combustion products produced by the first turbine combustor, and wherein when the generated swirl angle information indicates that a current swirl angle is not within a predetermined tolerance of the expected swirl angle, the control system diagnoses a poor fit for the expected swirl angle and updates the expected swirl angle using the generated swirl angle information.

Embodiment 7

The system of any preceding embodiment, wherein comparing the respective sensor responses to the expected sensor response comprises comparing a first delay time of the one or more first sensors to an expected delay time, the delay time comprises a delay between a time at which the adjustment of the operational parameter is made and a time at which the respective sensor response occurs, and the expected delay time comprises an expected delay between the time at which the adjustment of the operational parameter is made and the time at which the respective sensor response occurs.

Embodiment 8

The system of any preceding embodiment, wherein when the delay time of a single sensor of the one or more first sensors is not within a predetermined tolerance of the expected delay time, the control system diagnoses a degraded state of the single sensor, and utilizes adjacent sensors to monitor the one or more parameters of the combustion products produced by the first turbine combustor.

Embodiment 9

The system of any preceding embodiment, wherein when at least one sensor of the one or more first sensors has a response that is not within the predetermined tolerance of the expected sensor response, the control system provides an indication that the at least one sensor is in a degraded state, and the control system uses sensors that are adjacent to the at least one sensor to monitor the one or more parameters of the combustion products.

Embodiment 10

The system of any preceding embodiment, wherein when a predetermined percentage of the one or more first sensors have a response that is not within the predetermined tolerance of the expected sensor response, the control system provides a turbine combustor fault indication, a fuel supply fault indication, an oxidant supply fault indication, or any combination thereof.

Embodiment 11

The system of any preceding embodiment, wherein when the first sensor response is within the predetermined tolerance of the expected response, the turbine combustor diagnostic routine re-adjusts operation of the first turbine combustor to normal operation, and begins testing a second turbine combustor of the plurality of turbine combustors.

Embodiment 12

The system of any preceding embodiment, wherein normal operation comprises combustion of the fuel/oxidant mixture at a predetermined equivalence ratio in the presence of an exhaust gas diluent.

Embodiment 13

The system of any preceding embodiment, wherein the predetermined equivalence ratio is between approximately 0.95 and 1.05, and wherein a sensor of the plurality of sensors is a wideband oxygen sensor.

Embodiment 14

The system of any preceding embodiment, comprising an exhaust gas compressor driven by the turbine, wherein the exhaust gas compressor is configured to compress exhaust gas generated by the turbine from the combustion products and supply the compressed exhaust gas to the turbine combustion system as an exhaust gas diluent.

Embodiment 15

The system of any preceding embodiment, comprising an exhaust gas recirculation (EGR) system configured to recirculate the exhaust gas along an exhaust recirculation path from the turbine to the exhaust gas compressor.

Embodiment 16

A method, comprising: performing a turbine combustor diagnostic routine comprising the acts of: operating a first turbine combustor of a plurality of turbine combustors at a substantially steady state of combustion; adjusting an operational parameter of the first turbine combustor to cause a change in combustion products produced by the first turbine combustor; identifying a first sensor response of a first subset of a plurality of sensors disposed within or downstream from a turbine fluidly coupled to the turbine combustor, the first sensor response being indicative of the change in the combustion products, and wherein the first subset comprises one or more first sensors; correlating the first subset of sensors with the first turbine combustor; and diagnosing a condition of the first subset of the plurality of sensors, the first turbine combustor, or a combination thereof, based on the first sensor response.

Embodiment 17

The method of embodiment 16, wherein adjusting the operational parameter of the first turbine combustor comprises adjusting a flow of compressed exhaust gas diluent to the first turbine combustor to cause a change in combustion temperature.

Embodiment 18

The method of embodiments 16 or 17, wherein adjusting the operational parameter of the first turbine combustor comprises adjusting a flow of fuel to the first turbine combustor, or a flow of oxidant to the first turbine combustor, or a combination thereof, to cause a change in a combustion equivalence ratio of the first turbine combustor.

Embodiment 19

The method of any preceding embodiment, comprising determining whether the first subset of sensors corresponds to an expected subset of sensors correlated to the first turbine combustor.

Embodiment 20

The method of any preceding embodiment, comprising de-correlating the expected subset of sensors if the expected subset of sensors and the first subset of sensors do not match.

Embodiment 21

The method of any preceding embodiment, comprising updating swirl angle information correlated to the first turbine combustor if the expected subset of sensors and the first subset of sensors do not match.

Embodiment 22

The method of any preceding embodiment, comprising determining whether the first sensor response is within a predetermined tolerance of an expected sensor response.

Embodiment 23

The method of any preceding embodiment, comprising providing an indication of a fuel to oxidant ratio shift when the first sensor response is indicative of a first combustion equivalence ratio, the expected sensor response is indicative of a second combustion equivalence ratio, and the first and second combustion equivalence ratios do not match within the predetermined tolerance.

Embodiment 24

The method of any preceding embodiment, comprising adjusting the operational parameter, an additional operational parameter, or a combination thereof, of the first turbine combustor until the first and second combustion equivalence ratios match within the predetermined tolerance.

Embodiment 25

The method of any preceding embodiment, wherein when the first sensor response is within the predetermined tolerance of the expected sensor response, the turbine combustor diagnostic routine re-adjusts operation of the first turbine combustor to the substantially steady state of combustion, and begins testing a second turbine combustor of the plurality of turbine combustors.

Embodiment 26

The method of any preceding embodiment, wherein identifying the first sensor response comprises identifying a first time delay between the adjustment of the operational parameter and the first sensor response.

Embodiment 27

The method of any preceding embodiment, comprising determining whether the first time delay is within a predetermined time delay range, and providing a sensor fault indication when the first time delay is not within the predetermined time delay range.

Embodiment 28

The method of any preceding embodiment, wherein identifying the first sensor response of the first subset of the plurality of sensors comprises identifying a location of the first subset of the plurality of sensors, and determining whether the first sensor response is homogeneous across the entire first subset when the first subset comprises more than one sensor.

Embodiment 29

The method of any preceding embodiment, comprising identifying one or more sensors of the first subset of the plurality of sensors having a respective sensor response outside of a predetermined range of the first sensor response, and providing a sensor fault indication for the one or more sensors.

Embodiment 30

The method of any preceding embodiment, wherein operating the first turbine combustor of the plurality of turbine combustors at the substantially steady state of combustion comprises operating the first turbine combustor at a combustion equivalence ratio of between approximately 0.95 and 1.05, and wherein each sensor of the plurality of sensors is a wideband oxygen sensor.

Embodiment 31

The method of any preceding embodiment, wherein operating the first turbine combustor of the plurality of turbine combustors at the substantially steady state of combustion comprises combusting a fuel/oxidant mixture in the presence of a recirculated exhaust gas recirculated from the turbine.

Embodiment 32

A system, comprising: one or more tangible, machine-readable media collectively storing one or more sets of instructions executable by a processor to perform a turbine combustion system diagnostic routine comprising: operating a first turbine combustor of a plurality of turbine combustors at a combustion equivalence ratio of between approximately 0.95 and 1.05; adjusting a flow of fuel, a flow of oxidant, or a combination thereof, to the first turbine combustor to cause combustion products produced by the first turbine combustor to change from first combustion products to second combustion products that are different than the first combustion products; identifying a first sensor response of a first sensor that detects the second combustion products; correlating the first sensor with the first turbine combustor; and diagnosing a condition of the first sensor, the first turbine combustor, or a combination thereof, based on the first sensor response.

Embodiment 33

The system of embodiment 32, wherein adjusting the flow of fuel, the flow of the oxidant, or a combination thereof, to the first turbine combustor comprises increasing the flow of the fuel such that the second combustion products comprise a higher concentration of uncombusted fuel that the first combustion products.

Embodiment 34

The system of embodiments 32 or 33, wherein the first sensor response comprises a first fuel to oxidant ratio, and wherein the turbine combustion system diagnostic routine comprises comparing the first fuel to oxidant ratio of the first sensor response with a second fuel to oxidant ratio of an expected response.

Embodiment 35

The system of any preceding embodiment, wherein when the first sensor is one of a plurality of first sensors, and the first sensor response does not fall within a tolerance range of an expected sensor response, the turbine combustion system diagnostic routine comprises providing a sensor fault indication for the first sensor, and at least a second sensor of the plurality of first sensors having a respective response falling within the tolerance range for monitoring combustion products produced by the first turbine combustor.

Embodiment 36

The system of any preceding embodiment, wherein when the first sensor is one of a plurality of first sensors, and a predetermined number of the first sensors have respective sensor responses that do not fall within a tolerance range of an expected sensor response, the turbine combustion system diagnostic routine comprises providing a combustor fault indication for the first turbine combustor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
 a gas turbine system, comprising:
  a turbine combustion system comprising a plurality of turbine combustors, including a first turbine combustor, each combustor of the plurality of turbine combustors being configured to combust a fuel/oxidant mixture to produce combustion products;

a turbine driven by the combustion products produced by the turbine combustion system;

a plurality of sensors positioned downstream of the turbine combustion system and configured to monitor one or more parameters of the combustion products; and a control system comprising one or more non-transitory machine-readable media collectively storing one or more sets of instructions executable by a processor to perform a diagnostic routine comprising:

adjusting, at a first time, an operational parameter of the first turbine combustor of the plurality of turbine combustors to cause a change in the combustion products produced by the first turbine combustor;

identifying, at a second time, a respective sensor response of a first sensor of the plurality of sensors that detects the change in the combustion products, the respective sensor response comprising a delay time being between the first time and the second time;

correlating the respective sensor response with the first turbine combustor; and comparing the delay time of the respective sensor response to an expected delay time of an expected sensor response to diagnose a condition of the first sensor, the expected delay time being between the first time and a third time at which the respective sensor response is expected to occur; and wherein, when the delay time is not within a predetermined tolerance of the expected delay time, the control system diagnoses a degraded state of the first sensor and utilizes sensors adjacent to the first sensor to monitor the one or more parameters of the combustion products produced by the first turbine combustor.

2. The system of claim 1, wherein the control system performs a corrective action, provides a user-perceivable indication, or a combination thereof, when the respective sensor response is not within the predetermined tolerance.

3. The system of claim 2, further comprising comparing an actual position of the first sensor having the respective sensor response to an expected position of a sensor expected to have the respective sensor response, and wherein the control circuitry uses the actual position of the first sensor having the respective sensor response when the actual position and the expected position are not the same.

4. The system of claim 3, wherein the diagnostic routine comprises:

using the actual position of the first sensor to generate swirl angle information of combustion products produced by the first turbine combustor; and comparing the generated swirl angle information to expected swirl angle information for the combustion products produced by the first turbine combustor, and wherein, when the generated swirl angle information is not within a predetermined tolerance of the expected swirl angle, the control system diagnoses a poor fit for the expected swirl angle and updates the expected swirl angle using the generated swirl angle information.

5. The system of claim 2, wherein, when the respective sensor response of the first sensor is within the predetermined tolerance of the expected response, the turbine combustor diagnostic routine re-adjusts operation of the first turbine combustor to normal operation, and begins testing a second turbine combustor of the plurality of turbine combustors.

6. The system of claim 5, wherein normal operation comprises combustion of the fuel/oxidant mixture at a predetermined equivalence ratio in the presence of an exhaust gas diluent.

7. The system of claim 6, wherein the predetermined equivalence ratio is between approximately 0.95 and 1.05, and wherein a sensor of the plurality of sensors is a wideband oxygen sensor.

8. The system of claim 1, wherein adjusting the operational parameter of the first turbine combustor of the plurality of turbine combustors comprises adjusting a fuel/oxidant ratio in the first turbine combustor by adjusting a fuel level trim valve such that the expected sensor response is indicative of a particular fuel/oxidant ratio in the first turbine combustor;

wherein, when the respective sensor response of the first sensor of the plurality of sensors is not within an additional predetermined tolerance of the particular fuel/oxidant ratio, the control system uses a sensor of the plurality of sensors that is adjacent to the first sensor to monitor the fuel/oxidant ratio, provides a fault indication of the first sensor, or a combination thereof.

9. The system of claim 8, wherein, when the respective sensor responses of all of the plurality of sensors are not within the additional predetermined tolerance of the particular fuel/oxidant ratio, the control system provides a fault indication of multiple sensors, including the first sensor, provides a fault indication of the first turbine combustor, adjusts the operation of the first turbine combustor, or any combination thereof.

10. The system of claim 1, comprising:

an exhaust gas compressor driven by the turbine, wherein the exhaust gas compressor is configured to compress exhaust gas generated by the turbine from the combustion products and supply the compressed exhaust gas to the turbine combustion system as an exhaust gas diluent; and an exhaust gas recirculation (EGR) system configured to recirculate the exhaust gas along an exhaust recirculation path from the turbine to the exhaust gas compressor.

11. A method
for performing the diagnostic routine, using the control system of claim 1, comprising the acts of:

operating the first turbine combustor of the plurality of turbine combustors at a substantially steady state of combustion;

adjusting the operational parameter of the first turbine combustor to cause the change in combustion products produced by the first turbine combustor;

identifying a first sensor response of a first subset of the plurality of sensors disposed within or downstream from the turbine fluidly coupled to the turbine combustor, the first sensor response being indicative of the change in the combustion products, and wherein the first subset comprises one or more first sensors;

correlating the first subset of sensors with the first turbine combustor; and diagnosing a condition of the first subset of the plurality of sensors, the first turbine combustor, or a combination thereof, based on the first sensor response.

12. The method of claim 11, wherein adjusting the operational parameter of the first turbine combustor comprises adjusting a flow of compressed exhaust gas diluent to the first turbine combustor to cause a change in combustion temperature, or adjusting a flow of fuel or oxidant to the first turbine combustor to cause a change in a combustion equivalence ratio of the first turbine combustor.

13. The method of claim 11, comprising:
determining whether the first subset of sensors corresponds to an expected subset of sensors correlated to the first turbine combustor; and
de-correlating the expected subset of sensors if the expected subset of sensors and the first subset of sensors do not match, or updating swirl angle information correlated to the first turbine combustor if the expected subset of sensors and the first subset of sensors do not match, or a combination thereof.

14. The method of claim 11, comprising:
determining whether the first sensor response is within a predetermined tolerance of an expected sensor response; and
providing an indication of a fuel to oxidant ratio shift when the first sensor response is indicative of a first combustion equivalence ratio, the expected sensor response is indicative of a second combustion equivalence ratio, and the first and second combustion equivalence ratios do not match within the predetermined tolerance.

15. The method of claim 14, comprising adjusting the operational parameter, an additional operational parameter, or a combination thereof, of the first turbine combustor until the first and second combustion equivalence ratios match within the predetermined tolerance.

16. The method of claim 11, wherein when the first sensor response is within the predetermined tolerance of the expected sensor response, the turbine combustor diagnostic routine re-adjusts operation of the first turbine combustor to the substantially steady state of combustion, and begins testing a second turbine combustor of the plurality of turbine combustors.

17. The method of claim 11, wherein identifying the first sensor response comprises identifying a first time delay between the adjustment of the operational parameter and the first sensor response, and wherein the turbine combustor diagnostic routine comprises determining whether the first time delay is within a predetermined time delay range, and providing a sensor fault indication when the first time delay is not within the predetermined time delay range.

18. The method of claim 11, wherein identifying the first sensor response of the first subset of the plurality of sensors comprises identifying a location of the first subset of the plurality of sensors, and determining whether the first sensor response is homogeneous across the entire first subset when the first subset comprises more than one sensor.

19. The method of claim 11, wherein operating the first turbine combustor of the plurality of turbine combustors at the substantially steady state of combustion comprises operating the first turbine combustor at a combustion equivalence ratio of between approximately 0.95 and 1.05 and combusting the fuel/oxidant mixture in the presence of a recirculated exhaust gas recirculated from the turbine, and wherein each sensor of the plurality of sensors is a wideband oxygen sensor.

20. A system, comprising:
one or more tangible, machine-readable media collectively storing one or more sets of instructions executable by a processor to perform a diagnostic routine comprising:
operating a first turbine combustor of a plurality of turbine combustors at a combustion equivalence ratio of between approximately 0.95 and 1.05;
adjusting, at a first time, a flow of fuel, a flow of oxidant, or a combination thereof, to the first turbine combustor to cause combustion products produced by the first turbine combustor to change from first combustion products to second combustion products that are different than the first combustion products;
identifying, at a second time, a first sensor response of a first sensor that detects the second combustion products, the first sensor being one of a plurality of sensors positioned downstream of the plurality of turbine combustors and the first sensor response comprising a delay time being between the first time and the second time;
correlating the first sensor response with the first turbine combustor; and
comparing the delay time of the first sensor response to an expected delay time of an expected sensor response to diagnose a condition of the first sensor, the expected delay time being between the first time and a third time at which the first sensor response is expected to occur.

21. The system of claim 20, wherein adjusting the flow of fuel, the flow of the oxidant, or a combination thereof, to the first turbine combustor comprises increasing the flow of the fuel such that the second combustion products comprise a higher concentration of uncombusted fuel than the first combustion products, wherein the first sensor response comprises a first fuel to oxidant ratio, and wherein the diagnostic routine comprises comparing the first fuel to oxidant ratio of the first sensor response with a second fuel to oxidant ratio of the expected sensor response.

22. The system of claim 21, wherein, when the delay time of the first sensor response does not fall within a tolerance range of the expected delay time of the expected sensor response, the diagnostic routine comprises providing a sensor fault indication for the first sensor, and utilizes at least a second sensor of the plurality of sensors for monitoring combustion products produced by the first turbine combustor, the second sensor being adjacent to the first sensor.

23. The system of claim 21, wherein, when a predetermined number of the plurality of sensors have respective sensor responses that do not fall within a tolerance range of respective expected sensor responses, the diagnostic routine comprises providing a combustor fault indication for the first turbine combustor.

* * * * *